US011294908B2

(12) United States Patent
Pepakayala et al.

(10) Patent No.: US 11,294,908 B2
(45) Date of Patent: Apr. 5, 2022

(54) SMART SEARCH AND NAVIGATE

(71) Applicant: Oracle International Corporation, Redwood Shores, CA (US)

(72) Inventors: Subhash Chandra Pepakayala, Hyderabad (IN); Amrit Mishra, Hyderabad (IN); Manan Saleem Beg, Srinagar (IN); Shraddha Piparia, Dist Durg (IN); Shah Rushabh Shailesh, Mumbai (IN)

(73) Assignee: Oracle International Corporation, Redwood Shores, CA (US)

( * ) Notice: Subject to any disclaimer, the term of this patent is extended or adjusted under 35 U.S.C. 154(b) by 781 days.

(21) Appl. No.: 14/937,713

(22) Filed: Nov. 10, 2015

(65) Prior Publication Data
US 2017/0132331 A1 May 11, 2017

(51) Int. Cl.
*G06F 16/2457* (2019.01)
*H04W 4/60* (2018.01)

(52) U.S. Cl.
CPC ........ *G06F 16/24575* (2019.01); *H04W 4/60* (2018.02)

(58) Field of Classification Search
CPC ... G06F 16/24575; G06F 16/242; H04W 4/60
See application file for complete search history.

(56) References Cited

U.S. PATENT DOCUMENTS

| 6,779,060 | B1 * | 8/2004 | Azvine | G06F 3/038 |
| | | | | 710/65 |
| 8,042,151 | B2 * | 10/2011 | Olsen | G06F 21/6218 |
| | | | | 713/182 |
| 8,386,929 | B2 | 2/2013 | Zaika et al. | |
| 8,839,247 | B2 | 9/2014 | Millmore et al. | |
| 9,235,654 | B1 * | 1/2016 | Gupta | G06F 17/3097 |
| 9,268,462 | B2 * | 2/2016 | Civelli | G06F 3/0484 |
| 2004/0083367 | A1 * | 4/2004 | Garg | G06F 21/602 |
| | | | | 713/170 |
| 2006/0069599 | A1 * | 3/2006 | Hatoun | G06Q 10/0633 |
| | | | | 705/7.27 |
| 2008/0319944 | A1 | 12/2008 | Venolia et al. | |

(Continued)

OTHER PUBLICATIONS

Smart Search for AspDotNetStorefront retrieved from http://licenseportal.aspdotnetstorefront.com/p-945-smart-search-for-aspdotnetstorefront.aspx.

*Primary Examiner* — Charles D Adams
(74) *Attorney, Agent, or Firm* — Kilpatrick Townsend & Stockton LLP

(57) ABSTRACT

A method and a system are disclosed to facilitate a user to request and complete a computer task. In various embodiments, as the user is inputting keywords in a search interface through an application, one or more suggestions can be presented to the user to recommend a computer task. The suggestions can be generated based on the keyword(s) input by the user thus far, and various contexts such as an application context, a user context, a search context and/or any other contexts. Upon user selection of a suggestion as computer task requested by the user, a task flow to facilitate the user to complete the computer task can be determined. In some examples, the task flow can be implemented one or more interfaces in the application where the user initiates the computer task request. In some examples, the task flow can be implemented in a separate interface from the application.

19 Claims, 13 Drawing Sheets

(56) References Cited

U.S. PATENT DOCUMENTS

| | | | |
|---|---|---|---|
| 2010/0121861 A1* | 5/2010 | Marsden | G06Q 50/02 707/752 |
| 2011/0145822 A1 | 6/2011 | Rowe et al. | |
| 2011/0320472 A1* | 12/2011 | Griffith | G06F 17/30696 707/767 |
| 2012/0023089 A1 | 1/2012 | Chandra et al. | |
| 2013/0117204 A1* | 5/2013 | Vadlamani | G06N 5/022 706/12 |
| 2013/0339254 A1 | 12/2013 | Figlin et al. | |
| 2014/0136519 A1 | 5/2014 | Latzina et al. | |
| 2015/0006564 A1* | 1/2015 | Tomkins | G06F 17/30867 707/767 |
| 2015/0081653 A1* | 3/2015 | Hsu | G06F 3/04883 707/706 |
| 2015/0242504 A1* | 8/2015 | Profitt | G06F 3/04842 707/767 |
| 2016/0071179 A1* | 3/2016 | Babcock | G06F 9/453 705/26.61 |
| 2016/0179816 A1* | 6/2016 | Glover | G06F 16/24578 707/749 |
| 2016/0217124 A1* | 7/2016 | Sarikaya | G06F 17/2765 |
| 2016/0350304 A1* | 12/2016 | Aggarwal | G10L 15/26 |
| 2016/0371395 A1* | 12/2016 | Dumant | G06F 16/24575 |
| 2018/0285444 A1* | 10/2018 | Joshi | G06F 17/30654 |

\* cited by examiner

An Example Implementation Of System 100

SMART SEARCH AND NAVIGATE

BACKGROUND OF THE INVENTION

Embodiments of the present invention relate generally to methods and systems for enabling a user to request a computer task and more particularly to generating suggestions for presentation to the user based on an incomplete user query input by the user and facilitating the user to complete requested computer task.

Within many applications, a method for navigating and locating information has typically been done using search dialogs with specific search terms. For example, a user can input a keyword or keywords in a search dialog to obtain information related to the keyword(s) entered by the user. One or more results may be returned in response to the user search. In some implementations, the returned results are presented within an interface of the application. In some other implementations, the user may be directed to a web page where the results are listed. In any case, the results may describe information related to the topic the user is looking for. Based on such information, the user may learn some details about a topic of interest to the user or may refine the search with new keyword(s).

SUMMARY OF THE INVENTION

Embodiments of the invention provide systems and methods for assisting a user to request and complete a computer task. According to one embodiment, assisting the user to request and complete the computer task can comprise generating, in response to receiving an incomplete user query input by the user, one or more suggestions to assist the user to request a computer task for performance; and facilitating the user to complete the requested computer task after the one or more suggestions are presented to the user. A given suggestion generated in accordance with the disclosure can indicate a corresponding computer task suggested to the user. In some examples, the given suggestion may indicate a computer task by which an action is performed on a business object within an Enterprise Resource Planning (ERP) system.

Generating the one or more suggestions may comprise receiving the incomplete user query through a search interface provided by an application being engaged by the user. The incomplete user query may contain one or more keywords. For generating the one or more suggestions, an context of the application in which the user inputs the incomplete user query may be determined. The one or more suggestions may be generated based on the application context and/or the one or more keywords. The one or more generated suggestions may be presented to the user in an interface of the application being engaged by the user. The user may be enabled to select a suggestion from the one or more suggestions to request a computer task to be performed. Facilitating the user to complete the computer task can comprise receiving a user task request from the user indicating the computer task requested by the user, and determining a task flow for the requested computer task. The determined task flow may include information indicating one or more procedures, steps, processes and/or any other task components for completing the requested computer task.

After the task flow is determined for the requested computer task, interface information may be determined for implementing the determined task flow on a computing device associated with the user that inputs the incomplete user query. In some examples, the determined interface information, when implemented on a client computing device associated with the user, may cause the client computing device to present one or more controls within an interface of the application currently being engaged by the user. In those examples, the one or more controls may facilitate the user to complete the requested computer task in accordance with the task flow. In some examples, the determined interface information, when implemented on the client computing device, may cause the client computing device to direct the user to one or more interfaces other than the one where the user initiates the user task request. The one or more interfaces may facilitate the user to complete the requested computer task in accordance with the determined task flow. In some examples, the application may include an ERP application.

In some examples, the context of the application in which the user inputs the incomplete user query may include a position within the application where the user inputs the incomplete user query, one or more pages the user has traversed before the user inputs the incomplete user query, one or more other applications the user has engaged before the user inputs the incomplete query, one or more other computer tasks performed by the user using the application before the user inputs the incomplete user query, and/or one or more objects interacted by the user before the user inputs the incomplete query. The application context may be used to generate one or more suggestions to the user in response to receiving the incomplete user query.

In some examples, for generating the one or more suggestions, a context associated with the user that inputs the incomplete user query can be determined. The user context may include a role of the user, a responsibility of the user, a domain, a department, a region, or any other entity associated with the user, and/or any other user context. In those examples, it can be determined that one or more computer tasks can be performed by the user based on the user context associated with the user. For example, based on the role of the user, one or more business objects relevant to the role of the user can be determined and those business objects may be included in the one or more suggestions for presentation to the user.

In some examples, for generating the one or more suggestions, a search context may be determined. In one example, the search context may include a current search session in which the user inputs the incomplete user query. In that example, previous user queries input by the user in the current session may be extracted. The previous user queries may indicate a series of related computer tasks of interest to the user. Such a search context associated with the incomplete user query may be used to generate the one or more suggestions.

In some examples, a given suggestion presented to the user may include one or more parameters for performing an action on an object included in the given suggestion. For example, the given suggestion may include an action/object pair indicating a computer task that may receive additional parameter(s) for completing the computer task. In that example, such additional parameters may be determined, for example, based on the application context, the user context, and/or the search context.

In some examples, a user task request may be received after the one or more presentations have been presented to the user. The user task request may indicate a requested computer task selected by the user from the one or more suggestions. In some examples, the requested computer task can be used to improve future generation of suggestions to the user. For instance, the user selection of the computer task from the one or more suggestion can be associated with a corresponding incomplete user query input by the user. One or more of such an association can be obtained for ranking the one or more suggestions.

In some examples, after the user task request has been received, a task flow for completing the user requested computer task may be determined. Interface information may be determined such that when the interface information is implemented on a client computing device associated with the user, the user can be facilitated to complete the requested computer task in accordance with the determined task flow. In one example, the implementation of the determined interface information may cause the computing device to present one or more controls within an interface in the application the user initiated the user task request such that the user is enabled to use the controls to complete the requested computer task within the application. In another example, the implementation of the determined interface information may cause the computing device to direct the user one or more separate applications or separate pages where the user may complete the requested computer task. In that example, the user may be enabled to return to the application where the user initiated the requested computer task.

Other objects and advantages of the invention will be apparent to those skilled in the art based on the following drawings and detailed description.

DETAILED DESCRIPTION

Figure 1:
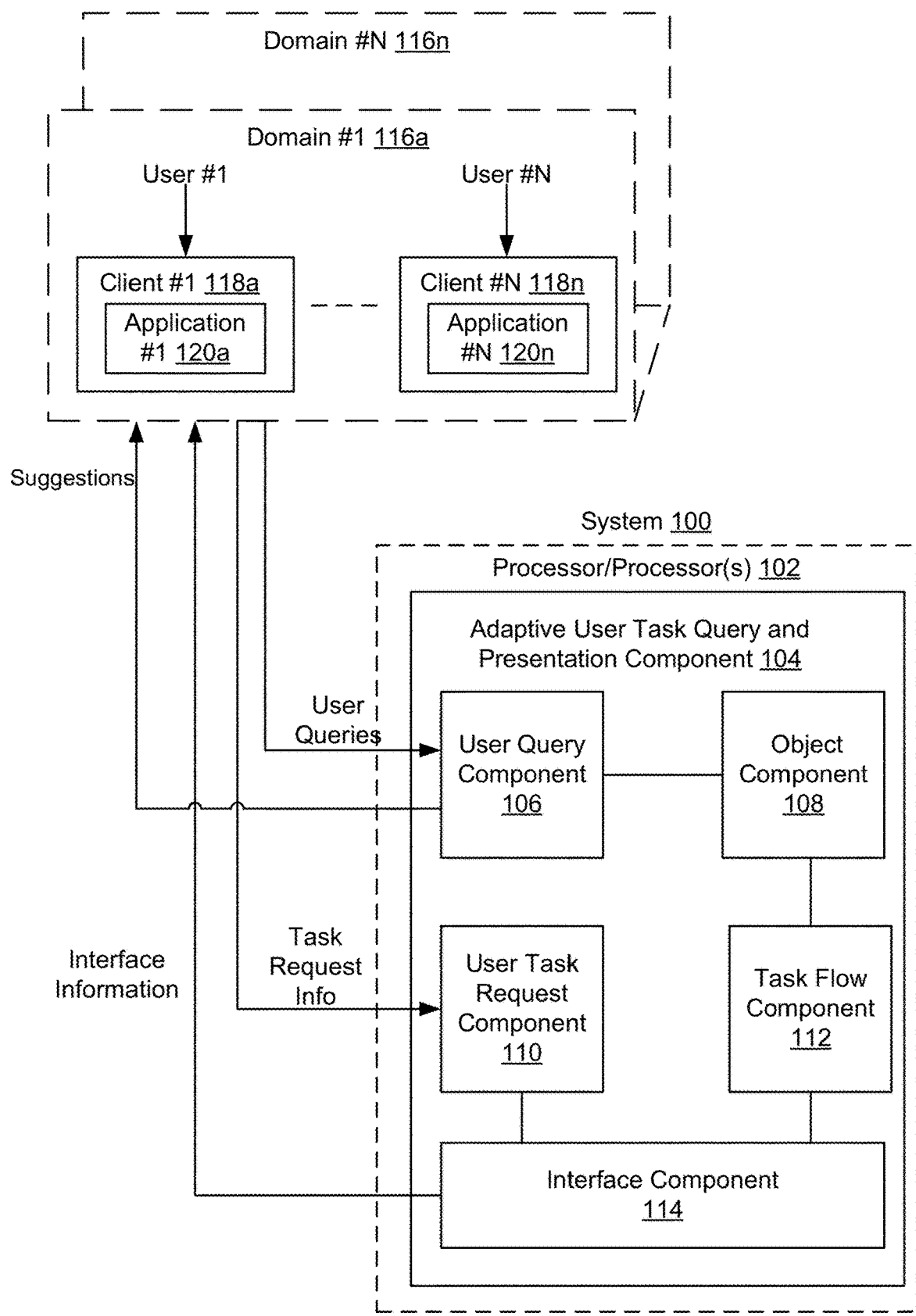
FIG. 1 generally illustrates an architecture for assisting a user to complete a computer task in accordance with the disclosure.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

The present disclosure relates generally to assisting a user to request and complete a computer task. The computer task may be performed or executed by one or more computing devices. The performance of the computer task may result in an action being performed on an object as specified the computer task. The execution of the computer task by the computing device(s) may require one or more parameters, which may direct the computing device(s) to execute the computer task with different inputs and/or in different manners. In some examples, a task flow may be associated with the computer task. The task flow may indicate one or more steps, processes, procedures, and/or any other type of task components for executing the corresponding computer task. Generally, at the completion of the execution of the computer task, one or more effects may transpire. Such effect(s) may include an output (e.g., data or information) being generated as a result of the execution of the computer task. However, it should be understood this is not necessarily the only case. In some examples, at the completion of the execution of the computer task in accordance with the disclosure, an output may not be necessarily generated. Instead, in those examples, one or more state changes related to the computer task may take place. As illustration, for example, the computer task may involve scheduling generation of a sales report for a time period at a specific time (e.g., create a sales report of every month on the $29^{th}$ day of every month). In that example, the computer task is scheduling the generation of the sales report for the time period at the specific time. At the completion of the execution of such a computer task (the scheduling of the sales report generation), an output is not necessarily generated, but a state of change of an system (e.g., an ERP system) may take place (e.g., the generation of the sales report is scheduled to be performed every month on the $29^{th}$ day).

A given object may be stored in a computing system or data storage with certain structure (e.g., data structure). In some examples, the given object may comprise data from one or more data sources, such as a table, a file, a database, a data warehouse, and/or any other type of data sources. In some examples, the object may represent a view or views into a corresponding data source. For example, the object may include a sales report containing a view of a sales table stored in a database such that a portion of the sales data in the sales table may be included in the sales report. Examples of an object in accordance with the disclosure may include a data report (e.g., a sales report), a project plan, a calendar, an invoice, a data graph, a macro-command, a timesheet, a word document, and/or any other type of object. As mentioned above, one or more actions may be associated with an object. The one or more actions, when executed by the computing device(s), may or may not change the data and/or information included in the object. Examples of such an action may include create, edit, delete, copy, view, and/or any other actions. In certain embodiments, executing the computer task may result in an action being performed on a business object within an Enterprise Resource Planning (ERP) system.

In certain embodiments, assisting the user to request and perform the computer task may include receiving an incomplete user query. The incomplete user query may be received through a search interface provided by an application currently being engaged by the user. For purposes of this disclosure, an "application" used herein may include software comprising one or more user interfaces, which may include graphical user interfaces (GUI), voice user interfaces, command-line user interfaces, gesture input interfaces, (e.g., gesture inputs by a user in an area monitored by one or more sensors), and/or any other type of user interfaces. In some implementations, the search interface may facilitate the user to input a search string. In those implementations, as the user is in a progress of inputting the user query, e.g., one or more keywords, one or more suggestions may be generated and presented to the user in the search interface to assist the user to select a computer task intended to be performed by the user. In one embodiment, the suggestion(s) are presented to the user in a drop down menu of the search interface. A given of the one or more suggestions may comprise an action/object pair corresponding to a computer task suggested to the user. The one or more suggestions may be generated based on the keyword(s) in the incomplete user query input by the user thus far, and/or various contexts related to the incomplete user query. The various contexts may include an application context in which the user initiates the incomplete user query, a user context associated with the user, a search context with respect to the incomplete user query, and/or any other contexts. In some examples, the one or more suggestions may be ranked for presentation to the user based on prior suggestion selections by the user.

In certain embodiments, after the one or more suggestions are presented to the user in the search interface, a user task request may be received. The received user task request may include a computer task requested by the user for performance. A task flow may be determined for completing the requested computer task. After the task flow is determined, interface information may be generated. The interface information, when implemented on the computing device, may cause the computing device to facilitate the user to perform the user requested computer task in accordance with the determined task flow. In some examples, the interface information may cause the computing device to present one or more controls within an interface of the application where the user initiated the user task request. The one or more controls may enable the user to perform the requested computer task in accordance with the task flow within the interface of the application where the user initiated computer task. In some examples, the interface information may cause the computing device to direct the user to one or more other applications or pages where the user can complete the requested computer task in accordance with the task flow.

FIG. 1 generally illustrates an architecture for assisting a user to request and perform a computer task in accordance with the disclosure. As shown, the architecture may include an client/server architecture in which one or more client computing devices 118, such as the client computing devices 118a-n as shown in FIG. 1, may communicate with a system 100. System 100 may be configured to facilitate the user to perform the computer task. As shown, system 100 may include one or more processors 102 configured to execute machine-readable instructions. The machine-readable instructions, when executed by processor(s) 102, may simulate one or more components, which may include an adaptive user query and presentation component 104 as shown and may include any other component(s), if any. The adaptive user query and presentation component 104 may be configured to facilitate the user to request and perform the computer task. As shown in FIG. 1, the adaptive user query and presentation component 104 may include a user query component 106, an object component 108, a user task component 110, a task flow component 112, an interface component 114, and/or any other components.

The user query component 106 may be configured to receive user queries for computer tasks intended to be performed by the user. The user queries received by the user query component 106 may include incomplete user queries containing one or more keywords. The user query component 106 may be configured to process the incomplete user queries, generate one or more suggestions for presentation to the user, and/or perform any other operations. In various embodiments, the user query component 106 may be configured to generate the one or more suggestions based on a user context (e.g., a role of the user), an application context in which the user input an incomplete user query (e.g., a position within the application where the user input the incomplete user query), a search context with respect to the incomplete user query received (e.g., one or more query terms input by the user in a current search session), a user context associated with the user that inputs the incomplete user query, and/or any other factors. In some implementations, user query component 106 may be configured to rank the generated one or more suggestions for presentation to the user.

In some implementations, user query component 106 may be configured to determine a pattern between the incomplete user queries, and corresponding suggestions selected by the user. In those implementations, user query component 106 may be configured to generate and/or rank the one or more suggestions based on such a pattern. Details of an exemplary implementation of user query component 106 are provided in FIG. 3 and associated texts.

The object component 108 may be configured to retrieve object information regarding an object. The object information retrieved by the object component 108 may include object metadata information, which may include one or more attributes associated with the object and/or any other type of object metadata information. The one or more attributes may include a name of the object, a type of the object, a description of the object, one or more actions that can be performed on the object, an access matrix associated with the object, one or more data sources associated with the object, one or more parameters associated with the object and/or any other type of attributes that may be associated with the object. In some implementations, the object component 108 may be configured to perform a search for one or more objects based on the keyword(s) contained in the incomplete user query received by the user query component 106.

The user task component 110 may be configured to receive request information indicating a user requested computer task. The user task component 110 may be configured to process the received user request computer task to identify one or more actions and/or one or more objects specified by the user requested computer task. In some implementations, the user task component 110 may be configured to parse the request information to obtain application metadata information indicating an application context in which the user initiates the requested computer task. In some implementations, the user task component 110 may be configured to store information indicating the user requested computer task in association with a search context in which the user initiated a corresponding incomplete user query. As mentioned above, such information can be used by the user query component 106 to determine a pattern between the user selection of a suggestion and an incomplete user query based on which the suggestion is generated. Details of an exemplary implementation of the user task component 110 are provided in FIG. 7 and associated texts.

The task flow component 112 may be configured determine one or more task flows for a computer task. The task flow determined by the task flow component 112 may include one or more steps, processes, procedures, threads, and/or any other task components for completing the computer task. In some examples, the task flow determined by the task flow component 112 may specify an order by which the task components can be executed by one or more computing devices. In some examples, the task flow determined by the task flow component 112 may specify one or more applications, commands, software tools, software utilities, and/or any other software components that may be used to execute the computer task. In some examples, the task flow determined by the task flow component 112 may specify one or more cloud services and/or one or more computing devices that may be used to execute the computer task. In some examples, the task flow determined by the task flow component 112 may include data, information, objects, and/or any other type of task contents relevant to the computer task. In one example, the task flow determined by the task flow component 112 includes only data that the user is authorized to access. Other examples of a task flow in accordance with the disclosure are contemplated.

The interface component 114 may be configured to determine interface information for implementation on a computing device associated with the user, such as the client computing device 118 shown in FIG. 1. The interface information determined by the interface component 114 may include information reflecting a task flow determined by the task flow component 112. The interface information determined by the interface component 114 may be transmitted to the client computing device, and, when implemented on the client computing device 118, may cause the client computing device 118 to facilitate the user to perform the computer task in accordance with the task flow determined by the task flow component 112. In some examples, the interface information, when implemented on the client computing device 118, may cause the client computing device 118 to provide one or more controls within an interface or interfaces of the application where the user input the incomplete user query received by the user query component 106. In those examples, the user may be enabled to perform the computer task using these controls without having to leave the application currently being engaged by the user. In some examples, the interface information may cause the client computing device 118 direct the user to one or more other applications and/or pages where the user can perform the computer task, and may enable the user to return to the application where the user initiates the request for the performance of the computer task. In some examples, the interface information determined by the interface component 114, when implemented on the client computing device 118, may enable the user to perform the computer task within the application in a "quick action" mode or to navigate to an application and/or a page to perform the computer task in a "navigation away" mode.

A given client computing device 118, such as the client computing device 118*a-n*, may be associated with a user, such as user #1-N, as shown. As shown, an application, such as application 120*a-n*, may be implemented on the given client computing device 118. A given application 120 may include one or more interfaces and/or pages to enable a user to perform one or more actions on one or more objects. As mentioned above, the interface(s) included in the given application 120 may not be necessarily limited to a GUI. In some examples, the interface(s) included in the given application 120 may include a command-line interface, a voice interface, a gesture input interface, and/or any other type of interface. That is, for the purposes of this disclosure, the term "application" may include software drivers, threads, processes that do not necessarily have GUI. In any case, the given application 120 may include a search interface, which may be in the form of GUI (e.g., a search dialog box), a voice search interface, a gesture search interface, and/or any other form, through which the user may enter a user query for performing a computer task.

As also shown in FIG. 1, the client computing devices 118 and/or the users may be logically grouped into different domains, such as the domains 116*a-n* as shown. For example, the domains 116 may represent corresponding logical entities, such as a department the client computing devices 118 in the group all belong to, a common job responsibility the users in the group all have, a common geographic region the client computing devices 118 or the users in the group all belong to, or a combination of thereof. It should be understood this not intended to be limiting. In some other embodiments of the disclosure, the client computing devices 118 and/or the users may not be grouped into domains 116 as shown in FIG. 1.

Figure 2:
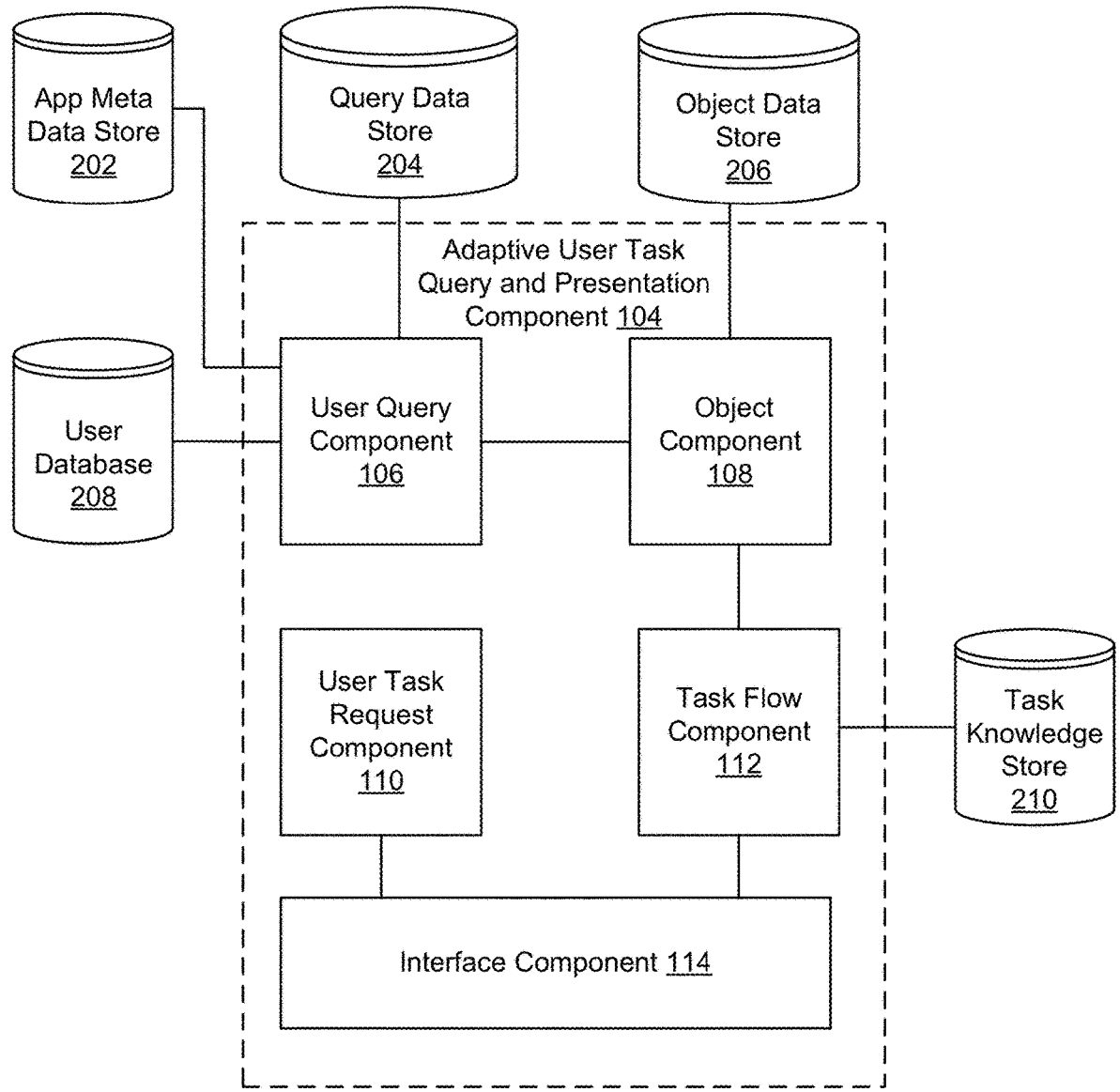
FIG. 2 generally illustrates an example of the system shown in FIG. 1 for assisting a user to request a computer task to be performed.

With the general architecture for assisting a user to request and perform a computer task having been described, attention is now directed to FIG. 2, where an exemplary implementation of system 100 is generally illustrated. As shown, in certain embodiments, system 100 may include an application metadata store 202, a query data store 204, an object data store 206, a user database 208, a task knowledge store 210, and/or any other data storage or data sources. The application metadata store 202 may be configured to store metadata associated with one or more applications provided by system 100, such as the application 120 shown in FIG. 1. The metadata associated with a given application 120 may include one or more attributes associated with the application 120, such as a name of the application 120, one or more functions enabled by application 120, one or more interfaces associated with application 120, one or more pages included in the application 120, one or more software components for the application 120, one or more parameters for the application 120, one or more contents provided by the application 120, one or more type of users supported by the application 120, one or more data sources associated with the application 120, one or more macro-commands/scripts associated with the application 120, and/or any other metadata.

In some implementations, the application metadata store 202 may be configured to store application metadata at a user level. For example, application metadata for may be stored in the application metadata store 202 in association with individual users of system 100. As illustration, a given user identified by a unique user ID may be associated with application metadata specific to that user. The user specific application metadata may include information indicating one or more applications 120 that have been installed and/or used by the given user, specific functions provided by the one or more applications 120 that have been used by the given user at specific time or time periods, user clicks within the one or more applications 120, specific interfaces and/or pages of the one or more applications 120 traversed by the give user at corresponding time or time periods, and/or any other user specific application metadata.

As shown, the application metadata store 202 may be operatively connected to user query component 106 to provide application metadata to the user query component 106. As will be discussed below, the application metadata provided by the application metadata store 202 can be used by the user query component 106 to determine one or more suggestions for presentation to the user in a search interface. In some implementations, the application metadata stored in the application metadata store 202 may be dynamically configured by the provider, system administrator(s), the user(s), and/or any other entities related to the system 100 manually. In some implementations, the application metadata stored in the application metadata store 202 may be obtained from client computing devices 118 periodically and automatically.

The query data store 204 may be configured to store data of user queries received by the user query component 106. The user query data stored by the query data store 204 may include one or more user queries input by a user during a search session. One or more of such a session may be stored for the user. For purposes of this disclosure, the term "search session" may be referred to as a time period during which the user engages in one or more search activities. The search sessions stored for the user may include a current search session in which the user is currently engaging in one or more search activities. The current search session may include one or more queries input by the user previously during the current search session. As shown, the query data store 204 may be operatively connected to the user query component 106. As mentioned above, the query data stored in the query data store 204 may be used by the user query component 106 to determine one or more suggestions for presentation to the user.

The object data store 206 may be configured to store information regarding one or more objects supported by the system 100. The information regarding a given object stored in the object data store 206 may include one or more attributes of the given object. As mentioned above, the one or more attributes may include a name of the object, a type of the object, a description of the object, one or more actions that can be performed on the object, an access matrix associated with the object, one or more data sources associated with the object, one or more parameters associated with the object and/or any other type of attributes that may be associated with the object. As shown, the object data store 206 may be operatively connected to the object component 108. As mentioned above, the object information stored in the object data store 206 may be used by the user query component 106 to determine a search context in which the incomplete user query is received.

The user database 208 may be configured to store user information regarding one or more users of system 100. The user information stored in user database 208 may include information indicating a role of a user (e.g., a manager, an associate, an administrator, a patient, a doctor), a job responsibility of the user (e.g., a sales personnel, a project manager, a chief operating officer, an accountant), one or more access matrixes associated with the user (e.g., the access matrixes may specific whether the user is authorized to access one or more resources, including the objects, within system 100, is authorized to perform one or more actions associated with the objects the user has access to, one or more privileges the user has within system (e.g., a root user, a power user, a regular user)), one or more applications the user has used or installed on a computing device, such as client computing device 118 shown in FIG. 1, and/or any other user information. As shown, the user database 208 may be operatively connected to the user query component 106. As mentioned above, the object data store 206 may be used by the user query component 106 to determine a context of the user that initiated an incomplete query received by user query component 106.

The task knowledge store 210 may be configured to store task flow information associated with computer tasks supported by system 100. The task flow information stored by the task knowledge store 210 may include information indicating one or more procedures, steps, processes and/or any other task components for completing the computer task. For example, the task information associated with a given computer task supported by system 100 may indicate specific steps for performing the given computer task, including specifying which interface(s), which controls, commands, parameters may be used to perform the computer task, and/or any other type of details regarding performing the given computer task.

Figure 3:
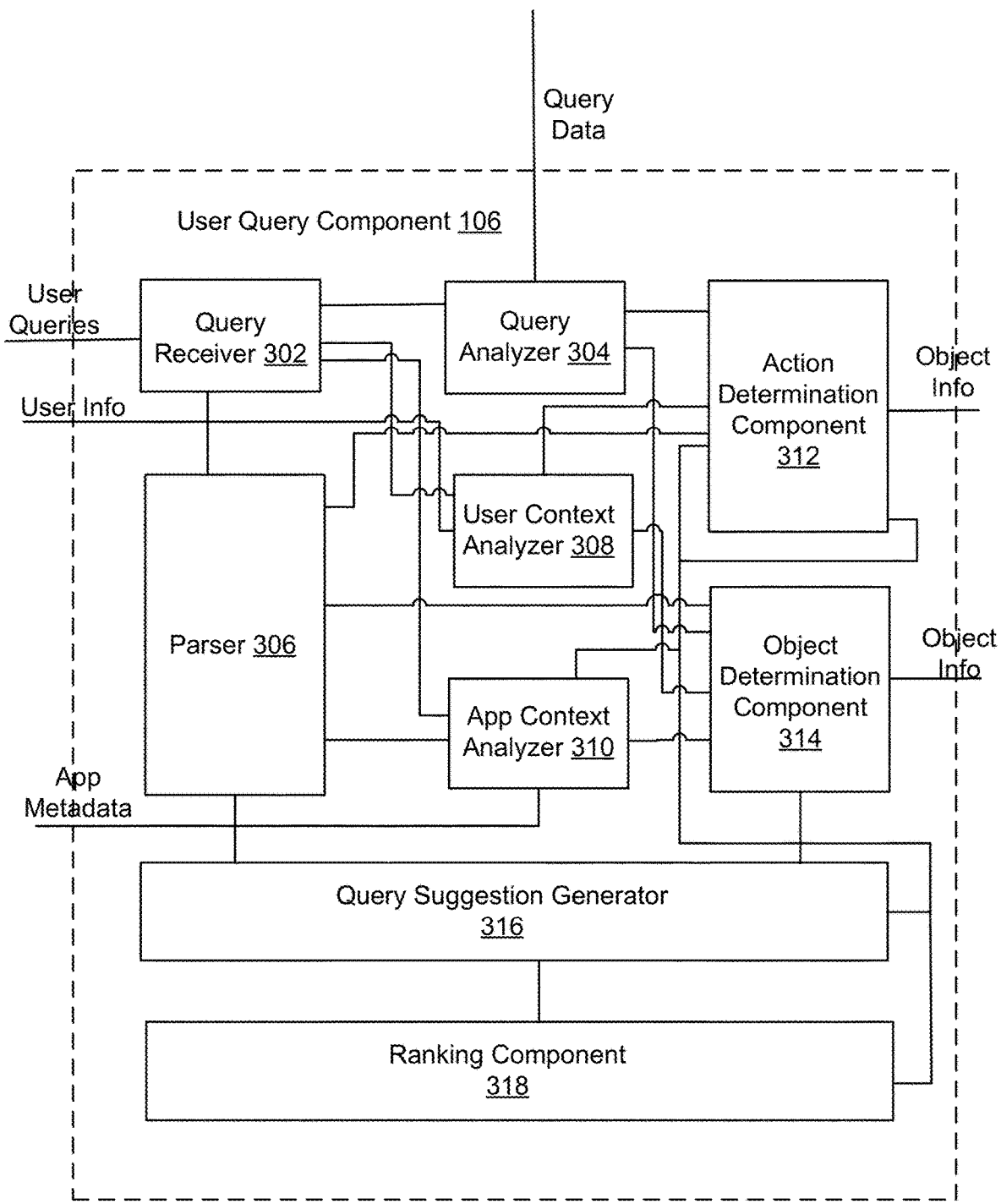
FIG. 3 illustrates an example of a user query component in the system shown in FIG. 2.

It should be understood, for purposes of this disclosure, the term "data store" may be referred to as a table, a database, a file, cloud storage, random access memory locations (RAM), read-only memory locations (ROM), and/or any other type of data store FIG. 3 illustrates an exemplary implementation of a user query component 106 shown in FIGS. 1-2. It will be described with reference to FIGS. 1-2. As shown, in certain embodiments, user query component 106 may include a query receiver 302, a query analyzer 304, a parser 306, a user context analyzer 308, an application context analyzer 310, an action determination component 312, an object determination component 314, a query suggestion generation component 316, a ranking component 318, and/or any other components. The query receiver 302 may be configured to receive user queries. The user queries received by the query receiver 302 may include incomplete queries input by users through a search interface provided by an application 120. The incomplete user queries received by the user query component 106 may contain one or more keywords. For receiving the incomplete user queries, in some implementations, a monitoring utility may be provided on a client computing device 118. In those implementations, the monitoring utility may be configured to periodically transmit user inputs (e.g., text, voice, gestures), received through the search interface to system 100 via query receiver 302. For instance, as the user inputs every keyword through the search interface, the monitoring utility may transmit the keyword to system 100. The query receiver 302 may be configured to receive the keywords transmitted from the client computing device 120, and may be configured to associate the received keywords with a corresponding user. For example, a keyword may be input by user #1 through a search interface in application 120a on client computing device 118a. The keyword may be transmitted to system 100 from client computing device 118a along with identification information identifying user #1, application 120a, and/or client computing device 118a. In some examples, the identification information associated with the keyword (or incomplete query) may indicate a context of the application in which the keyword (or incomplete query) was input by the user.

The parser 306 may be configured to parse the incomplete user queries received by the query receiver 302 and to extract one or more keywords from the incomplete user queries. This may involve recognizing one or more delimiters contained in the incomplete user queries and extracting the one or more keywords based on the recognized delimiters. In some examples, a "dictionary" of predetermined keywords may be consulted by parser 306 to parse the incomplete user query. In those examples, the "dictionary" may associate the predetermined keywords with corresponding keyword types or speeches. Examples of the keyword types may include noun, verb, object, action, and/or any other keyword types. For example, an incomplete user query received by the query receiver 302 may include a keyword "create". In that example, the parser 306 may determine the keyword "create" is an action or a verb based on the "dictionary". As another example, the incomplete user query received by the query receiver 302 may include a keyword "plan". In that example, the parser 306 may determine the keyword "plan" is an object or a noun based on the "dictionary". In some implementations, the parser 306 may be configured to translate a misspelt keyword. For example, the incomplete user query received by the parser 306 may include a misspelt keyword "crete". Parser 306 may be configured to determine the keyword intended by the user is "create" which is the best match to "crete" based on the "dictionary".

In some implementations, the parser 306 may be configured with Part Of Speech (POS) tagging to make use of natural language processing. For example, the parser 306 may be configured to interpret various possible meanings of the incomplete query based on the one or more keywords extracted by the parser 306. For instance, as illustration, the incomplete query can contain the keywords "open issue". In that case, the parser 306 may determine the keywords can mean a set of user queries such as "open the issue page", "view open issues", or "create a new issue". Still in that case, the parser 306 may generate sets of keywords (e.g., each set indicating the a possible user query illustrated above) in association with the incomplete user query received by the query receiver 302.

The user context analyzer 308 may be configured to determine a user context associated with a given user that inputs incomplete user query received by the query receiver 302. As shown, for such a determination, the user context analyzer 308 may be configured to receive user information regarding a user that inputs the incomplete user query received by the query receiver 302. The user information may include a name or ID of the user, one or more roles assumed by the user, one or more responsibilities of the user, one or more domains the user belongs to, one or more departments the user belongs to, a region the user is located in, a location the user is currently in, one or more access matrixes associated with the user and/or any other user context. For example, after the query receiver 302 receives the given incomplete user query from a client computing device 120, the user context analyzer 308 may be configured to obtain user context based on an identity of the user kept track by system 100. For example, system 100 may be configured to keep track of every user login and logout into an application 120, and record the user identity associated with each login.

The application context analyzer 310 may be configured to determine an application context in which the user inputs the incomplete user query received by query receiver 302. The application context determined by the application context analyzer 310 may include a position within the application where the user initiates the incomplete user query, one or more pages the user has traversed before the user initiates the incomplete user query, one or more other applications the user has engaged before the user initiates the incomplete user query, one or more other computer tasks performed by the user using the application before the user initiates the incomplete query, and/or one or more objects interacted by the user before the user initiates the incomplete query. As shown, the application context analyzer 310 maybe operatively connected to parser 306 for obtaining the application metadata. In some examples, the incomplete user query received by query receiver 302 may contain application metadata indicating an application context in which the incomplete user query was input by the user within application 120. In some examples, the application metadata may be periodically received from the client computing device 118 and stored in a application metadata store 202 as shown in FIG. 2. In those examples, the application context analyzer 310 may be configured to obtain the application metadata from the application metadata store 202.

The query analyzer 304 may be configured to analyze query data, for example, obtained from the query data store 204. In some examples, the analysis of the query data by query analyzer 304 may involve determining a search context with respect to the incomplete user query received by the query analyzer 304. In one example, determining the search context by the query analyzer 304 may include extracting queries input by the user in a current search session in which the user also inputs the received incomplete user query. In that example, the analysis by the query analyzer 304 may involve determining a pattern of the user queries previously input by the user in the current search session with respect to the incomplete user query. The determined pattern may indicate that user is performing a series of related computer tasks in the current search session. For example, the previous user queries input by the user may indicate the user is performing a series of tasks related to project management in the current search session. For instance, the previous user queries may include queries such as "create an expense report", "generate a spending report", "create a cash flow graph" and so on. These previous user queries may be used to determine one or more suggestions to the user by the query suggestion generation component 316.

In some implementations, the query data analyzed by the query analyzer 304 may indicate one or more search histories by the user that inputs the incomplete user query. For example, the one or more search histories may indicate queries input by the user within a time period or time periods (e.g., the past 24 hours, the past 3 days, the past week, the past month, and so on). As mentioned above, the user queries in the one or more search histories may be associated with corresponding computer tasks requested by the user after the user queries were input. For example, such search histories may indicate, at a specific time after the user input a user query, for example, "creating a sales report" through application 120, the user requested and performed "creating a sales report for the New York market" within the application 120. In that example, user query and the user request may be stored together in association, for example, in the query data store 204. This may be used by the ranking component 318 to rank the suggestions generated by the query suggestion generation component 316.

In some implementations, the query data analyzed by the query analyzer 304 may indicate one or more searches by one or more users other than the user that inputs the incomplete user query. For example, the query data analyzed by the query analyzer 304 may include current search sessions of users also currently engaging in applications 120; search histories by users similar to the user that inputs the incomplete user query; and/or any other type of query data indicating queries input other users. For example, the user that inputs the incomplete user query may be a sales representative, and the query data analyzed by the query analyzer 304 may include search histories indicating user queries input by other sales representatives.

The action determination component 312 may be configured to determine one or more actions for suggestions to the user based on the one or more keywords extracted by the parser 306 from the incomplete query received by the query receiver 302. This may involve obtaining object information from, for example, the object data store 206. In some implementations, the action determination component 312 may be configured to perform a search across the object data store 206 based on the one or more keywords extracted by the parser 306. For example, as illustration, the keywords extracted by the parser 306 may include keyword "sales report". In that example, the action determination component 312 may be configured to perform a search across the object data store 206. This may involve searching for object attributes associated with an object with an object name of "sales report", and obtaining the result of the search. The search result may return a set of one or more actions that may be performed on the object "sales report", such as create, delete, update, view, copy, and/or any other actions that may be performed on object "sales report".

In some implementations, the determination of the actions by the action determination component 312 may be based on the application context determined by the application context analyzer 310. For example, as mentioned above, the application context determined by the application context analyzer 310 may indicate a position within the application 120 the user inputs the incomplete user query. As illustration, the application context may indicate that the it was in a project management interface within the application 120 the user inputs the incomplete user query. The action determination component 312 may obtain the application metadata associated with the application 120, and the application metadata may indicate that within the project management interface the user can create or view a project expense report. In that example, after the user inputs the incomplete user query containing keywords "expense report", the action determination component 312 may determine, based on the afore-described application context, that the appropriate actions for suggestion to the user are "create" (the expense report), or "view" (the expense report). That is, the application context determined by the application context analyzer 310 may be used by the action determination component 312 to determine which one or ones actions is relevant to the application context and thus may be suggested to the user.

In some implementations, the determination of the action by the action determination component 312 may be based on the user context determined by the user context analyzer 308. For example, as mentioned above, the user context determined by the user context analyzer 308 may indicate a role assumed by the user that inputs the incomplete user query. In that example, as illustration, the user context may indicate that the user that inputs the incomplete user query is a sales representative and is not authorized to update, delete, or copy any sales report stored in the object data store 206. In that example, after the user inputs an incomplete query containing keywords "sales report", the action determination component 312 may determine, based on the afore-described user context, that the appropriate actions for suggestion to the user are "create" (the sales report) and "view" (the sales report). That is, the user context determined by the user context analyzer 308 may be used by the action determination component 312 to determine based on the user context which one or ones actions may be relevant to the user for suggested to the user.

In some implementations, the action determination by the action determination component 312 may be based on a search context with respect to incomplete user query. As mentioned above, such a context may be determined by the query analyzer 304. In some examples, the search context may indicate one or more user queries previously input by the user in the current search session. The one or more previously input user queries may be used by action determination component 312 to determine one or more appropriate actions for suggestions to the user. For example, as illustration, the one or more previously input user queries may include user queries such as "generate a sales report for this month", "view the generated sales report", "update the generated sales report" and so on. In that example, the received incomplete user query my include keywords "data graph". Based on the previously input user queries and these keywords, the action determination component 312 may determine the appropriate action for suggestion to the user is "create" (a data graph for the sales report) since the user has been performing computer task related to the sales report in the current search session.

The object determination component 314 may be configured to determine one or more objects for suggestions to the user based on the one or more keywords extracted by the parser 306 from the incomplete query received by the query receiver 302. This may involve obtaining object information from, for example, the object data store 206. In some implementations, the object determination component 314 may be configured to perform a search across the object data store 206 based on the one or more keywords extracted by the parser 306. For example, as illustration, the keywords extracted by the parser 306 may include keyword "create". In that example, the object determination component 314 may be configured to perform a search across the object data store 206. This may involve searching for object attributes associated with an object with an action "create", and obtaining the result of the search. The search result may return a set of one or more objects that can be created by user in system 100, such as sales report, expense report, project plan, macro-command, script and/or any other objects.

In some implementations, the determination of the objects by the object determination component 314 may be based on the application context determined by the application context analyzer 310. For example, as mentioned above, the application context determined by the application context analyzer 310 may indicate one or more computer tasks that have been performed by the user within the application 120, the user being the user that inputs the incomplete user query. As illustration, the application context may indicate that the computer tasks include "create an expense report", "update an expense report" and "create a cash flow report". In that example, after the user inputs the incomplete user query containing keywords "create a", the object determination component 314 may determine, based on the afore-described application context, that the appropriate objects for suggestion to the user are "project spending report" or "cash account report". That is, the application context determined by the application context analyzer 310 may be used by the object determination component 314 to determine which one or ones objects is relevant to the application context for suggestion to the user.

In some implementations, the determination of the object by the object determination component 314 may be based on the user context determined by the user context analyzer 308. For example, as mentioned above, the user context determined by the user context analyzer 308 may indicate a job responsibility of the user that inputs the incomplete user query. In that example, as illustration, the user context may indicate that the user that inputs the incomplete user query is a project manager. In that example, after the user inputs an incomplete query containing the keywords "create a", the object determination component 314 may determine, based on the afore-described user context, that the appropriate objects for suggestion to the user are "project plan", "staff assignment chart", "project progress report" or any other project objects that can be created by a project manager. That is, the user context determined by the user context analyzer 308 may be used by the object determination component 314 to determine based on the user context which one or ones objects are relevant to the user for suggestion to the user.

In some implementations, the object determination by the object determination component 314 may be based on a search context with respect to the incomplete user query. As mentioned above, such a context may be determined by the query analyzer 304. In some examples, the search context may indicate one or more user queries previously input by the user in the current search session. The one or more previously input user queries may be used by object determination component 314 to determine one or more appropriate actions for suggestions to the user. For example, as illustration, the one or more previously input user queries may include user queries such as "generate a sales report for this month", "view the generated sales report", "update the generated sales report" and so on. In that example, the received incomplete user query my contain keywords "generate a data". Based on the previously input user queries and the keywords, the object determination component 314 may determine the appropriate object for suggestion to the user is "data graph for a sales report" since the user has been performing computer tasks related to a sales report in the current search session.

In certain embodiments, the object determination component 314 may be configured to determine one or more parameters for suggestions to the user based on the one or more keywords extracted by the parser 306 from the incomplete query received by the query receiver 302. This may involve obtaining object information from, for example, the object data store 206. For example, as illustration, the keywords extracted by the parser 306 may include keyword "create a sales report". In that example, as illustration, the object determination component 314 may be configured to obtain object information regarding the "sales report" object, which may include attribute information indicating one or more parameters that may be supplied by user for creating a sales report. For instance, the one or more parameters may include a name for the sales report, a time period for which the sales report covers, sales data in one or more regions or markets the sales report includes, one or more legends of the sales reports, one or more products included in the sales report and/or any other parameters. These parameters may be included the suggestions generated by the query suggestion generation component 316 for presentation to the user.

The query suggestion generation component 316 may be configured to generate one or more suggestions for presentations to the user based on the one or more keywords extracted by the parser 306, the one or more actions determined by the action determination component 312, the one or more objects determined by the object determination component 314, and/or any other parameters. A given suggestion generated by the query suggestion generation component 316 may be presented to the user to help the user complete the incomplete user query. For example, as illustration, the incomplete user query may include keywords "sales report", the actions determined by the action determination component 312 may include "create", "update" and "view" a sales report. As mentioned above, in certain embodiments, the object determination component 314 may be configured to determine one or more parameters based on the keyword(s) contained in the incomplete user query. Still using the example where the keywords in the incomplete user query are "sales report", the one or more suggestions generated by the query suggestion generation component 316 may include parameters for the sales report, such as a time period, a region or market for the sales report, a project for the sales report and/or any other parameters for the sales report. As illustration, the one or more suggestions generated by the action determination component 312 may include "create a sales report between Sep. 1 to Sep. 30, 2015 for the New York region", "create a sales report for project XYZ", "create a monthly sales report", "update last month sales report for California", "view last month sales reports for project XYZ" and/or any other type of suggestions.

As another example, the incomplete user query may comprise a keyword "create". As mentioned above, based on this keyword, the object determination component 314 can determine one or more objects that may be created by the user that inputs the incomplete user query based on an application context, a search context in which the incomplete user query was input by the user, and/or a user context regarding the user. As illustration, the suggestions determined by the query suggestion generation component 316 may include "create a sales report for this month", "create a project plan", "create an expense report", "create a data graph for this month's sales report", and/or any other suggestions.

The ranking component 318 may be configured to determine an order by which the one or more suggestions generated by the query suggestion generation component 316 are presented to the user. For example, the ranking component 318 may determine for each of the one or more suggestions an score of interest level to the user and rank the one or more suggestions in accordance with the their scores. In some implementations, the ranking of the one or more suggestions by the ranking component 318 may be based on a historical pattern of user queries and user selected suggestions. As discussed above, the query data stored in the query data store 204 may include associations between an incomplete user query input by the user in the past, and a corresponding suggestion that was generated, among other suggestions, by the query suggestion generation component 316 and that was selected by the user after the suggestion was presented to the user. For example, as illustration, the user may input an incomplete query containing the keyword "create" in the last week 5 times within a search interface in the application 120. Suggestions such as "create a sales report", "create a project plan", "create a staff assignment chart" were generated based on this keyword, application context, user context and/or search context. In that example, the query data stored in query data store 204 may indicate that 3 times out of the 5 times, the user selected "create a sales report" from the suggestions and actually perform the selected suggestion—i.e., created a "sales report". In that example, the ranking component 318 may rank "create a sales report" higher than "create a project plan" such that the suggestion "create a sales report" is presented to the user earlier than the suggestion "create a project plan".

In some implementations, the ranking component 318 may be configured to rank the one or more suggestions based on one or more search histories of other users. For example, the query data analyzed by the query analyzer 304 may indicate one or more popular user queries by other users during a time period. For instance, as illustration, the query data analyzed by the query analyzer 304 may indicate other users were searching for "create a sales report" for different sales regions in the US and worldwide in the past week. This can mean a sales report for different regions are due for report (to management, or the public). In that example, the ranking component 318 may rank the suggestion "create a sales report for the New York market" higher than, say, "create a project" for presentation to the user, who is a sales representative in the New York market.

Figure 4:
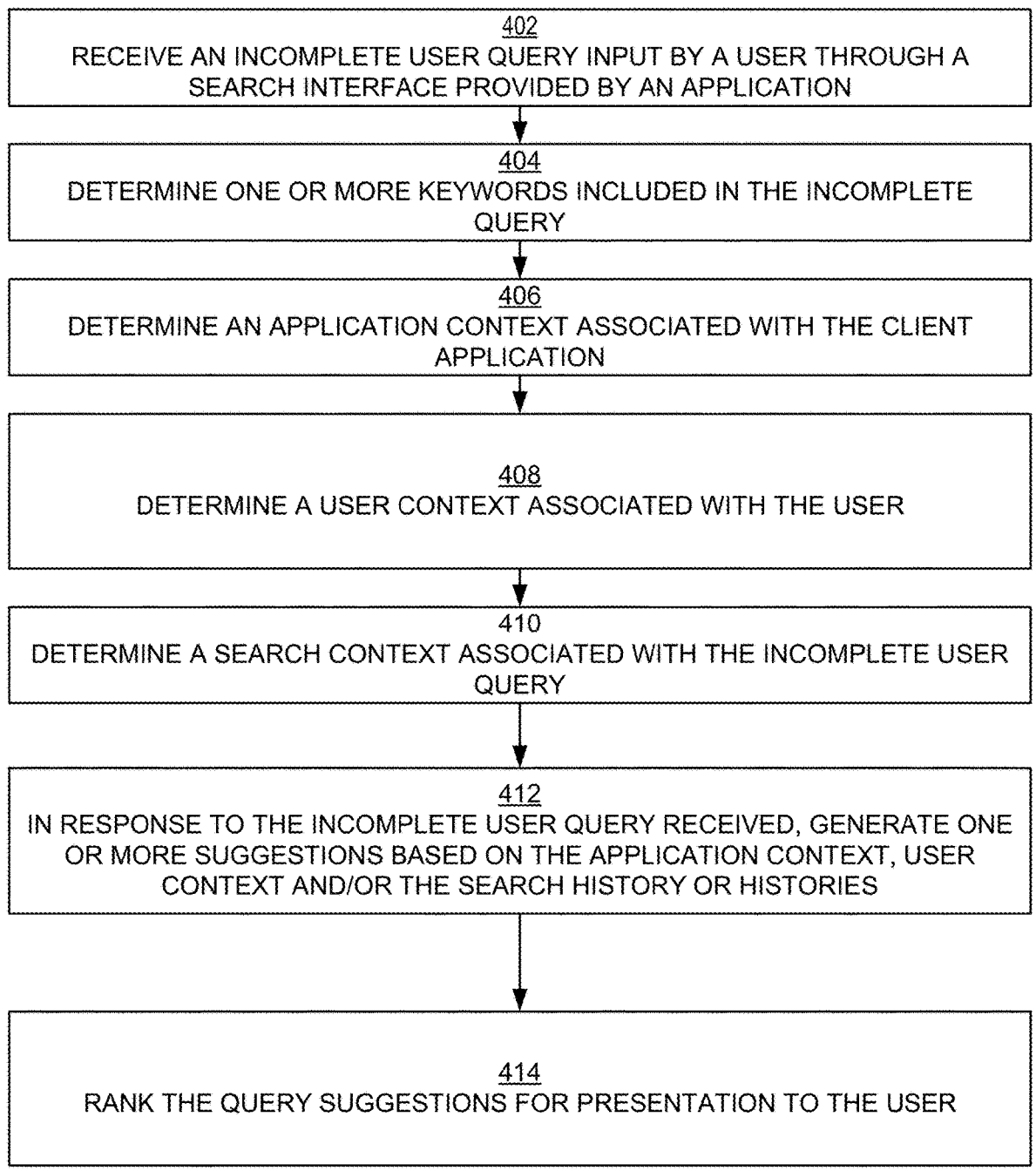
FIG. 4 is a simplified flow chart showing a process for processing an incomplete user query and generating one or more suggestions.

FIG. 4 is a simplified flow chart showing a process for processing an incomplete user query and generating one or more suggestions. The processing depicted in FIG. 4 may be implemented in software (e.g., code, instructions, program) executed by one or more processing units (e.g., processors, cores), hardware, or combinations thereof. The software may be stored in memory (e.g., on a non-transitory computer-readable storage medium such as a on a memory device). The particular series of processing steps depicted in FIG. 4 is not intended to be limiting. It is appreciated that the processing steps may be performed in an order different from that depicted in FIG. 4, and that not all the steps depicted in FIG. 4 need be performed. In certain embodiments, the processing depicted in FIG. 4 may be performed by the user query component 106 shown in FIGS. 1-3.

Figure 5:
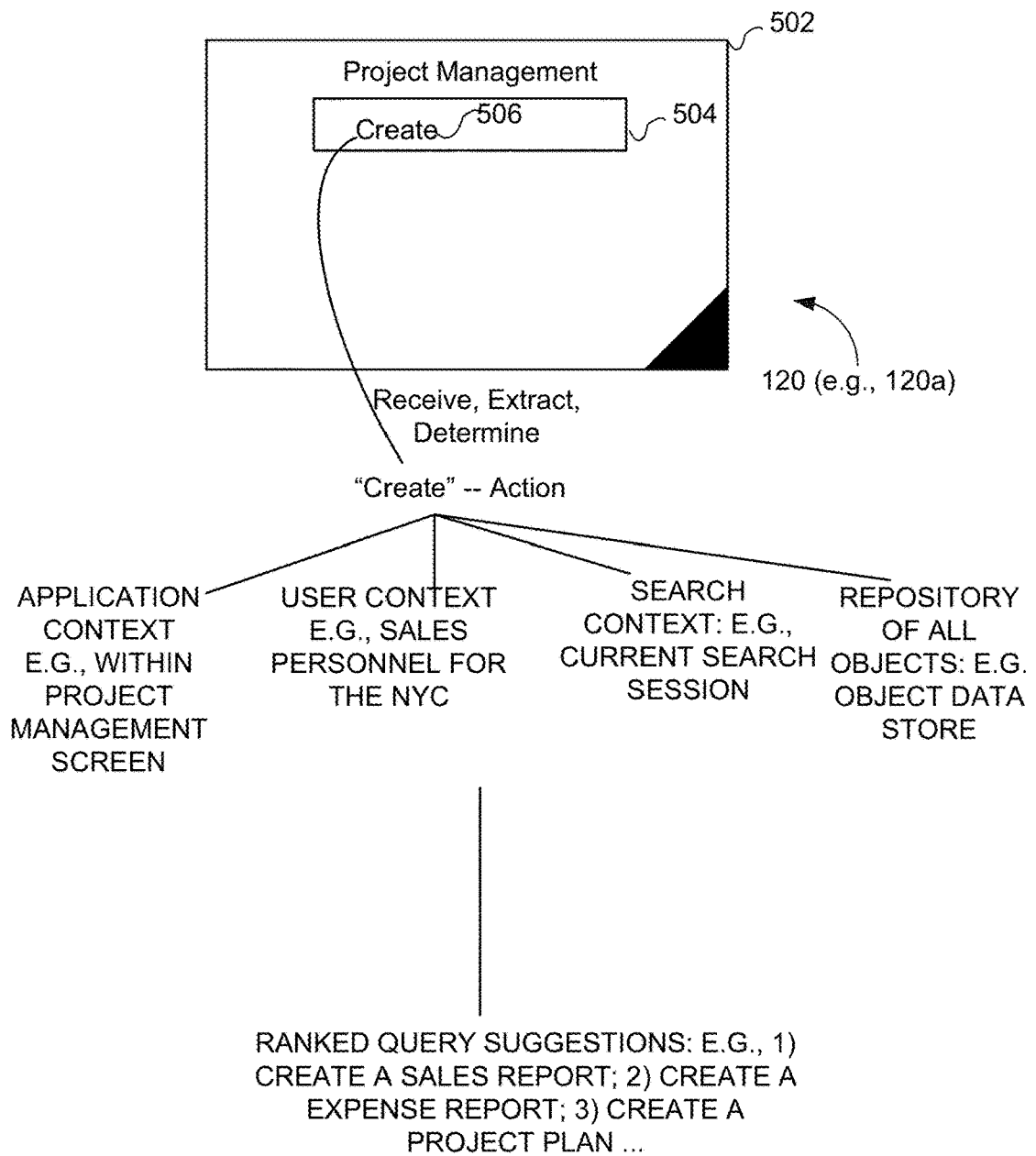
FIG. 5 conceptually illustrates an example of processing an incomplete user query and generating one or more suggestions.

In certain embodiments, the incomplete user query processing and suggestion generation performed by the user query component 106 may be broken down into the following phases:

At 402, an incomplete user query may be received. The incomplete user query received at 402 may be input by a user through a search interface provided by an application. This is illustrated in FIG. 5, which conceptually illustrates an example of processing the incomplete user query. As shown in FIG. 5, an interface 502 may be provided in application 120, such as application 120a shown in FIG. 1. In the example shown in FIG. 5, interface 502 enables the user to provide one or more functions related to project management, such as view project resources, progresses, project milestones achieved, project task assignments, or project staff information, create project plan, project progress report, project spending report for presentation to other users (e.g., management) or any other entities (e.g., the public), and/or any other project management functions. As shown, interface 502 provided by the application 120 may include a search interface 504, in which a user may input a user query 506 containing one or more keywords. In this example, the user query 506 input by the user is incomplete, which may be the case because the user is still in the progress of inputting more keywords towards the user query 506, or the user is unsure what objects the user can create within the interface 502 or within application 120. In implementations, the incomplete user query 506 may be received by the system 100 shown in FIGS. 1-2 via a monitoring utility installed on the client computing device 118, such as 118a shown in FIG. 1. In one implementation, the incomplete user query 506 is received by the query receiver 302 shown in FIG. 3.

Returning to FIG. 4, at 404, one or more keywords included in the incomplete user query received at 402 may be determined. This may involve recognizing one or more delimiters contained in the incomplete user query received at 402 and extracting the one or more keywords based on the recognized delimiters. In some examples, a "dictionary" of predetermined keywords may be used for such determination. In those examples, the "dictionary" may associated the predetermined keywords with corresponding keyword types or speeches. Examples of the keyword types may include noun, verb, object, action, and/or any other keyword types. In the example shown in FIG. 5, "create" may be extracted from the incomplete user query 502 and may be determined as an action. In some implementations, operations involved in 404 may be performed by a parser the same as or substantially similar to the parser 306 described and illustrated herein.

At 406, an application context in which the user inputs the incomplete query received at 402 may be determined. The application context determined at 406 may include a position within the application where the user initiates the incomplete user query, one or more pages the user has traversed before the user initiates the incomplete user query, one or more other applications the user has engaged before the user initiates the incomplete user query, one or more other computer tasks performed by the user using the application before the user initiates the incomplete query, one or more objects interacted by the user before the user initiates the incomplete query, and/or any other information. As discussed above, such an application context may be used to generate one or more suggestions for presentation to the user in response to the incomplete user query input by the user. In some implementations, the operations involved in 406 may be performed by an application context analyzer the same as or substantially similar to the application context analyzer 310 described and illustrated herein.

At 408, an user context associated with the user that inputs the incomplete user query received at 402 may be determined. The user context determined at 408 may include a role of the user, a responsibility of the user, a domain, a department, a region, or any other entity associated with the user, and/or any other user context. Such an user context may be used to determine one or more object and/or actions may be performed by the user. For example, based on the role of the user, one or more business objects relevant to the role of the user can be determined and those business objects may be included in the one or more suggestions for presentation to the user in response to the incomplete user query input by the user.

At 410, a search context with respect to the incomplete user query received at 402 may be determined. The search context may include a current search session in which the user inputs the incomplete user query. The current search session may include one or more queries input by the user thus far during the current search session. The one or more previously input user queries may be used to determine one or more appropriate actions and/or objects for suggestions to the user. For example, the user queries input by the user previously in the current search session may indicate a pattern or a series of related computer tasks having been performed by the user in the current search session. In some implementations, operations involved in 410 may be performed by a query analyzer the same as or substantially similar to the query analyzer 304 described and illustrated herein.

At 412, one or more suggestions may be generated for presentation to the user in response to the incomplete user query having been received at 402. A given suggestion generated at 412 may indicate a recommended computer task based on the incomplete query received at 402. The generation of the one or more suggestions at 412 may be based on the application context determined at 406, the user context determined at 408, the search context determined at 410, and/or any other factors. FIG. 5 illustrates the keyword "create" extracted from the incomplete user query 506 may be "processed" based on application context, user context, search context and/or object information regarding all objects supported by system 100 for generating the one or more query suggestions. In some implementations, operations involved in 412 may be performed by a query suggestion generation component the same as or substantially similar to the query suggestion generation component 316 described and illustrated herein.

Returning to FIG. 4, at 414, the one or more suggestions generated at 412 may be ranked. For example, at 414, a score may be determined for each of the one or more suggestions and the one or more suggestions may be ranked in accordance with the their scores. In some implementations, the ranking of the one or more suggestions at 412 may be based on a historical pattern of user queries and user selected suggestions. As discussed above, the query data stored in the query data store 204 may include associations between an incomplete user query input by the user in the past, and a corresponding suggestion that was generated, among other suggestions, and was selected by the user after the suggestions were presented to the user. Such query data may be used to rank the one or more suggestions at 414 such that suggestions matching previously user selected computer task in response to incomplete user queries the same as or similar to the incomplete user query received at 402.

FIG. 6 A illustrates an example of presenting suggestions in response to a user incomplete query in a search interface 604 provided by an application 120. It will be described with reference to FIG. 1. As shown, the application 120, such as the application 120a, shown in FIG. 1 may provide an interface 602, which may include a search interface 606. As shown, a user may be enabled to input user query through the search interface 604. In this example, the user query input by the user is an incomplete user query 606 containing one keyword 606 "create". As shown, in response to the incomplete user query 606 having been input the user, one or more suggestions 608, such as suggestions 608a-c shown in this example, may be presented to the user. As discussed above, the one or more suggestions 608 may be generated based on the incomplete user query 606, an application context in which the user inputs the incomplete user query 606, a user context associated with the user that inputs the incomplete user query 606, a search context with respect to the incomplete user query 606, and/or any other factors. In this example, as shown, the user selects suggestion 608a "create a task".

Figure 6A:
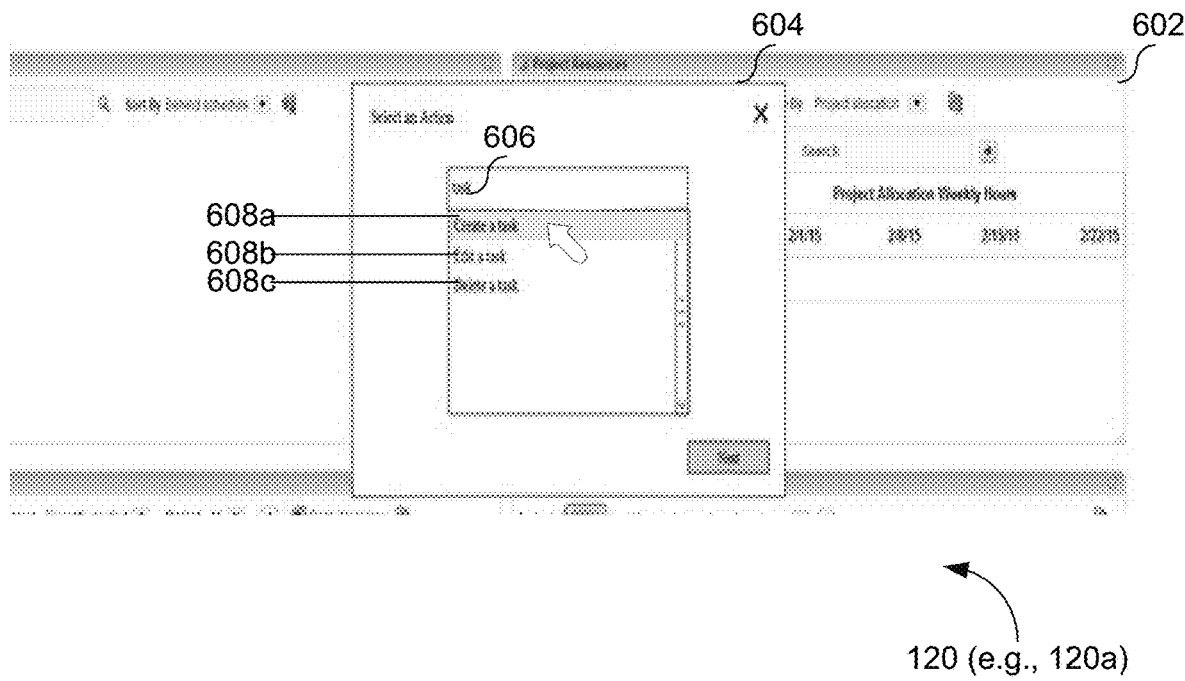
FIG. 6A illustrates an example of presenting suggestions in response to receiving an incomplete user query in a search interface provided by an application.

FIG. 6 B illustrates an example of presenting an interface requesting a value of a parameter for a computer task in response to the computer task being selected by the user in the search interface shown in FIG. 6A. As shown, after the user selects the suggestion "create a task" in the search interface 604, an interface 610 may be presented to the user for the user to select a parameter value for performing the user requested computer task—i.e., the suggestion 608a. In this example, as shown, the user prompted through a drop-down menu 612 to select a project for which the task will be created as requested by the user. As discussed above, in some implementations, system 100 may automatically determine one or more of such a parameter value. For instance, system 100 may automatically determine the one or more of the parameter value for performing the user requested computer task based on the application context, user context, search context as described and illustrated herein, and/or any other factors.

Figure 7:
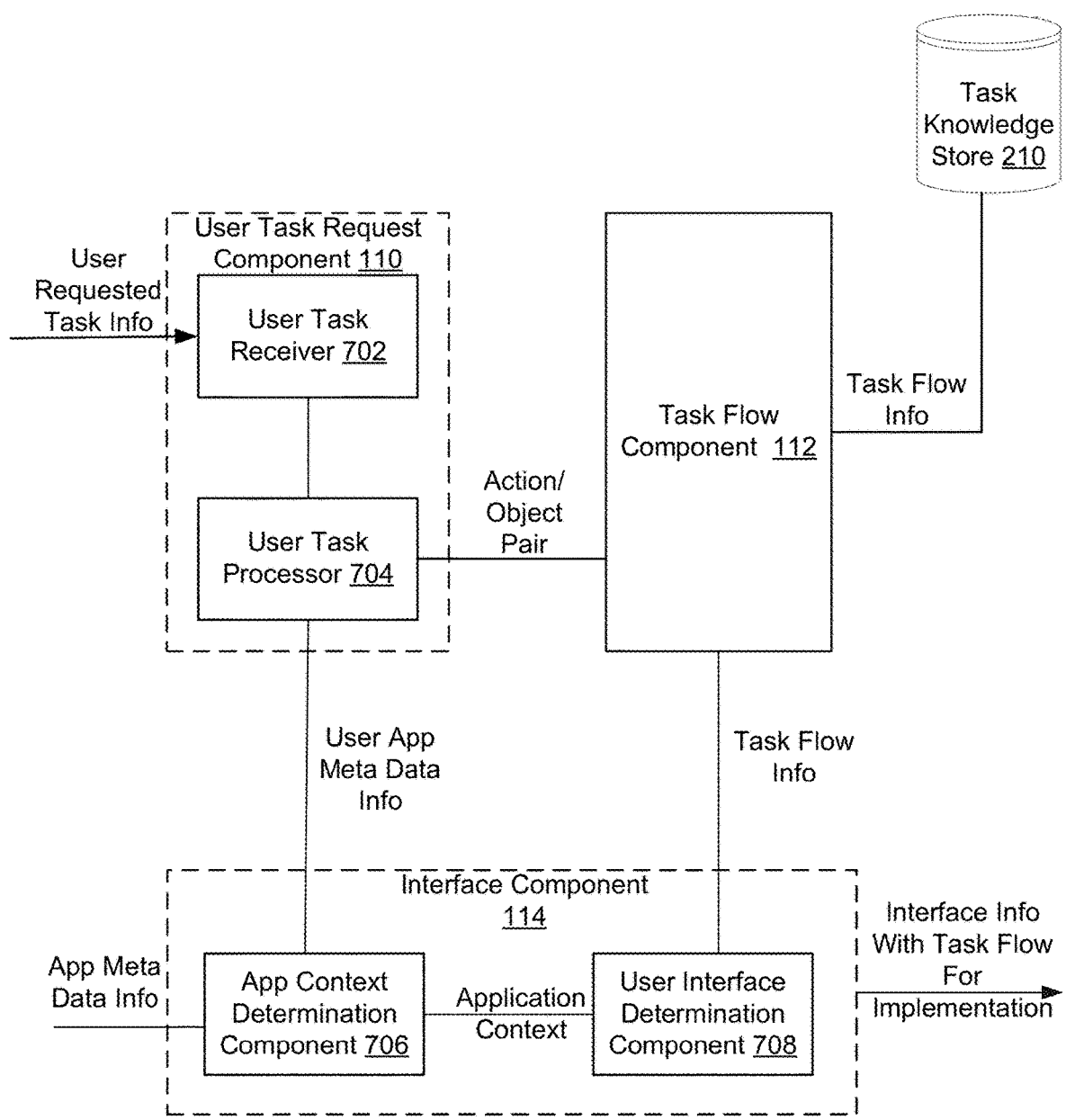
FIG. 7 generally illustrates another example of the system shown in FIG. 1 for assisting a user to request a computer task to be performed.

Attention is now directed to FIG. 7, where another example of system 100 is shown for assisting a user to request and perform a computer task. As shown, in certain embodiments, as in this example, the user task request component 110 shown in FIG. 1 may include a user task receiver 702, a user task processor 704, and/or any other components. The user task receiver 702 may be configured to receive a user task request for performing a computer task. The user task request received by the user task receiver 702 may include information indicating the computer task as requested by the user. The requested computer task may be selected by the user from the one or more suggestions presented to the user in the application 120 as illustrated in FIG. 6A. In some examples, the user request received by the user task receiver 702 may include application metadata information indicating an application context in which the user initiated the computer request. The application context that may be embedded in the request received by the user task receiver 702 are the same as or substantially similar that described and illustrated above with respect to generating one or more suggestions for presentation to the user in response to the user inputting an incomplete user query.

In some examples, the user task receiver 702 may be configured to record the computer task requested by the user in association with a corresponding incomplete user query. For instance, as illustration, the one or more suggestions generated by the user query component 106 may include suggestions such as "create a sales report", "update a sales report", "view a sales report" and "copy a sales report", based on an incomplete user query "sales report" received by the user query component 106. In that example, after these suggestions are presented to the user, the user may select the suggestion "create a sales report" as a requested computer task to system 100 for performance. After receiving this request from the user, user task receiver 702 may store the computer task in association with the incomplete user query "sales report", for example, in the query data store 204. As discussed above, such an association between the user quested computer task and corresponding incomplete query input by the user may be used by the user query component 106 to rank the one or more suggestions.

The user task processor 704 may be configured to process the user request received by the user task receiver 702. This may involve extracting computer task request information from the received user task request, extracting application context information described above, and/or any other operations. Extracting the information indicating the user requested computer task may involve identifying the computer task. In some implementations, the user task request received by the user task receiver 702 may include header information indicating location(s) within the received user task request that may contain user requested computer task information. In some implementations, the user task processor 704 may be configured to recognize such information. In those implementations, the user task processor 704 may use delimiters to search for a beginning and end of the computer task information. The application context information may be extracted by the user task processor in the same manner as the extracting of the user requested computer task information described above.

In some implementations, user task processor 704 may be configured to determine one or more action/object pairs included in the computer task requested by the user. Such an action/object pair may indicate an action to be performed on the corresponding object. For example, as illustration, the computer task requested by the user may be "create a task for project XYZ". In that example, the user task processor 704 may extract "task" from the request and determine it is an object supported by system 100, extract "create" from the request and determine it is an action to be performed on the object "task", and extract "project XYZ" from the request and determine it is a parameter value specified by the user for performing the requested task "create a task". As described above, this may involve determining a keyword type or speech associated with the individual keywords included in computer task request information received by the user task receiver 702. For example, the user task processor 704 may be configured to consult a "dictionary" determine a speech for a keyword included in the computer task request information received by the user receiver 702.

As shown in FIG. 7, the user task request component 110 may be operatively connected to the task flow component 112. In this example, the task flow component 112 may be configured to receive user requested computer task information and determine a task flow for the user requested computer task. Determining the task flow for the user requested computer task by the task flow component 112 may involve analyzing the computer task requested by the user. The task flow determined by the task flow component 112 may include information indicating one or more procedures, steps, processes and/or any other task components for performing the requested computer task. As shown, in certain embodiments, as in this example, the task flow component 112 may be configured to receive information indicating an object/action pair from the user task processor 704. Based on the object/action pair received, the task flow component 112 may be configured to search a task flow repository, such as the task knowledge store 210 shown in FIG. 2, for one or more task flows that match the object/action pair. The matching task flow may be implemented by system 100 for performing the action on the object indicated by the user requested computer task.

As still shown in FIG. 7, the interface component 114 may be operatively connected to the user task component 110 and the task flow component 112 to receive user application metadata information regarding an application where the user initiated the requested computer task, to receive the task flow information determined by the task flow component 112, and/or any other inputs. As shown, in certain embodiments, as in this example, the interface component 114 may include an application context determination component 706, a user interface determination component 708, and/or any other components. The application context determination component 706 may be configured to receive and analyze the user application metadata information from the user task processor 704, to determine, based on the analysis of the application metadata information, an application context in which the user initiated the user task request received at user task receiver 702, and/or to perform any other operations. The application metadata information received by the application context determination component 706 may indicate a name of the application where the user initiated the user task request received, an interface or page within the application where the user initiated the user task request received, a position with the interface or page within the application where the user initiated the user task request received.

Figure 6B:
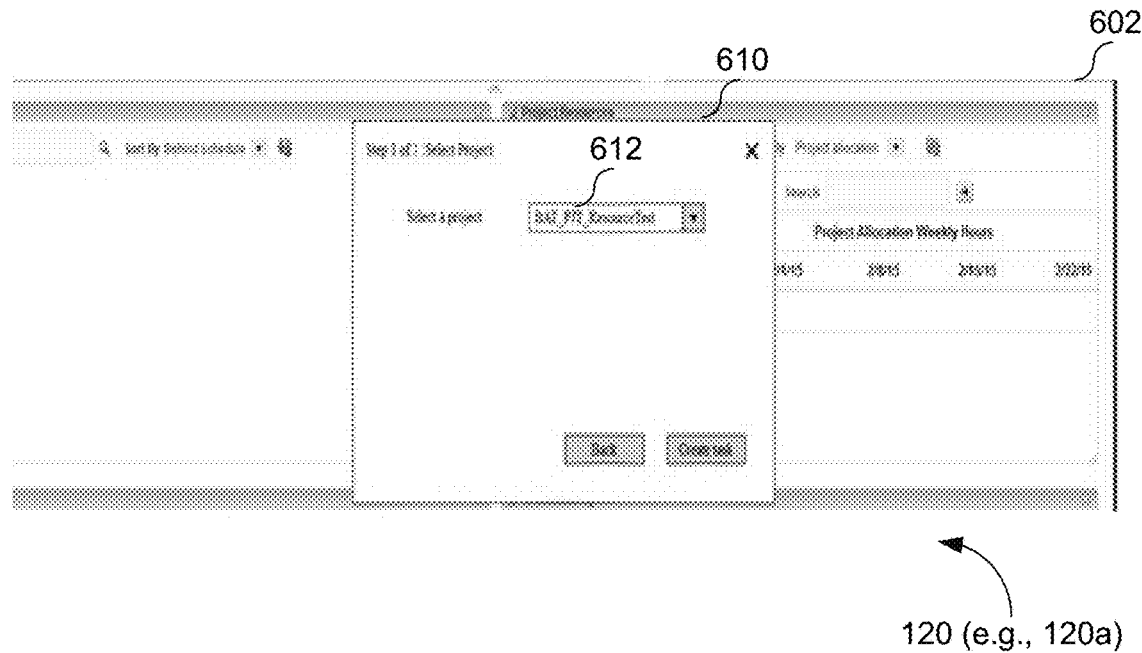
FIG. 6B illustrates an example of presenting an interface requesting a value of a parameter for a computer task in response to the computer task being selected by the user in the search interface shown in FIG. 6A.

Determining the application context by application context determination component 706 may involve obtaining application information from a storage within the system 100, such as the application metadata store 202 shown in FIG. 2. In one embodiment, after the user application metadata information is received from the user task component 110, the application context determination component 706 may obtain application information from the application metadata store 202 for details about application identified by the user application metadata information received. For example, as illustration, the application metadata information received may indicate the user initiated the user task request at a particular interface provided by application 120, for example in the project management interface as shown in FIGS. 6A-6B. In that example, the application context determination component 706 may obtain, from the application metadata store 202, details about the identified particular interface, for example, such as a frame size of the particular interface, one or more controls provided in the particular interface, look and feel of the particular interface, one or more context provided in the particular interface, and/or any other interface information associated with the particular interface.

The user interface determination component 708 may be configured to determine interface information for presentation to user. The interface information determined by the user interface determination component 708 may include information for implementing the task flow determined by task flow component 112. For example, the interface information determined by the user interface determination component 708 may include one or more field controls facilitating the user to complete the requested computer task step by step in accordance with the task flow received from the task flow component 112. In certain embodiments, as in this example, the user interface determination component 708 may be configured to determine the interface information based on the application context determined by the application context determination component 706. For example, the interface information determined by the user interface determination component 708, when implemented on a client computing device 118, may cause the client computing device 118 to present one or more interfaces that have appearances consistent with the application context determined by the application context determination component 706.

In some implementations, an "quick action" mode may be facilitated by the user interface determination component 708 such that the interface information may facilitate the user complete the requested computer task in accordance with the task flow within the application where the user initiated user task request without having to leaving that application. For instance, as illustration, the interface information determined by the user interface determination component 708, when implemented on a client computing device 118, such as the client computing device 118*a*, may cause the client computing device 118 to facilitate the user to complete the requested computer task within the current interface of the application 120 the user is engaging. As another illustration, the interface information determined by the user interface determination component 708, when implemented on the client computing device 118, may cause the client computing device 118 to present a pop-up window from the current interface of the application 120 the user is engaging such that the user is enabled to complete the requested computer task in accordance with the task flow determined by the task flow component 112.

In some implementations, a "quick navigation" mode may be facilitated by the user interface determination component 708 such that the interface information determined by the user interface determination component 708 may facilitate the user to navigate to another application or another page provided by system 100 to complete the computer task requested by the user. For example, as illustration, the interface information determined by the user interface determination component 708, when implemented on the client computing device 118, may present a link or a control in the current interface provided by the application the user is in. By acting on (e.g., clicking on) such a link or control, the user can navigate to a different application or page to complete the computer task request by the user in accordance with the task flow determined by the task flow component 112.

Figure 8:
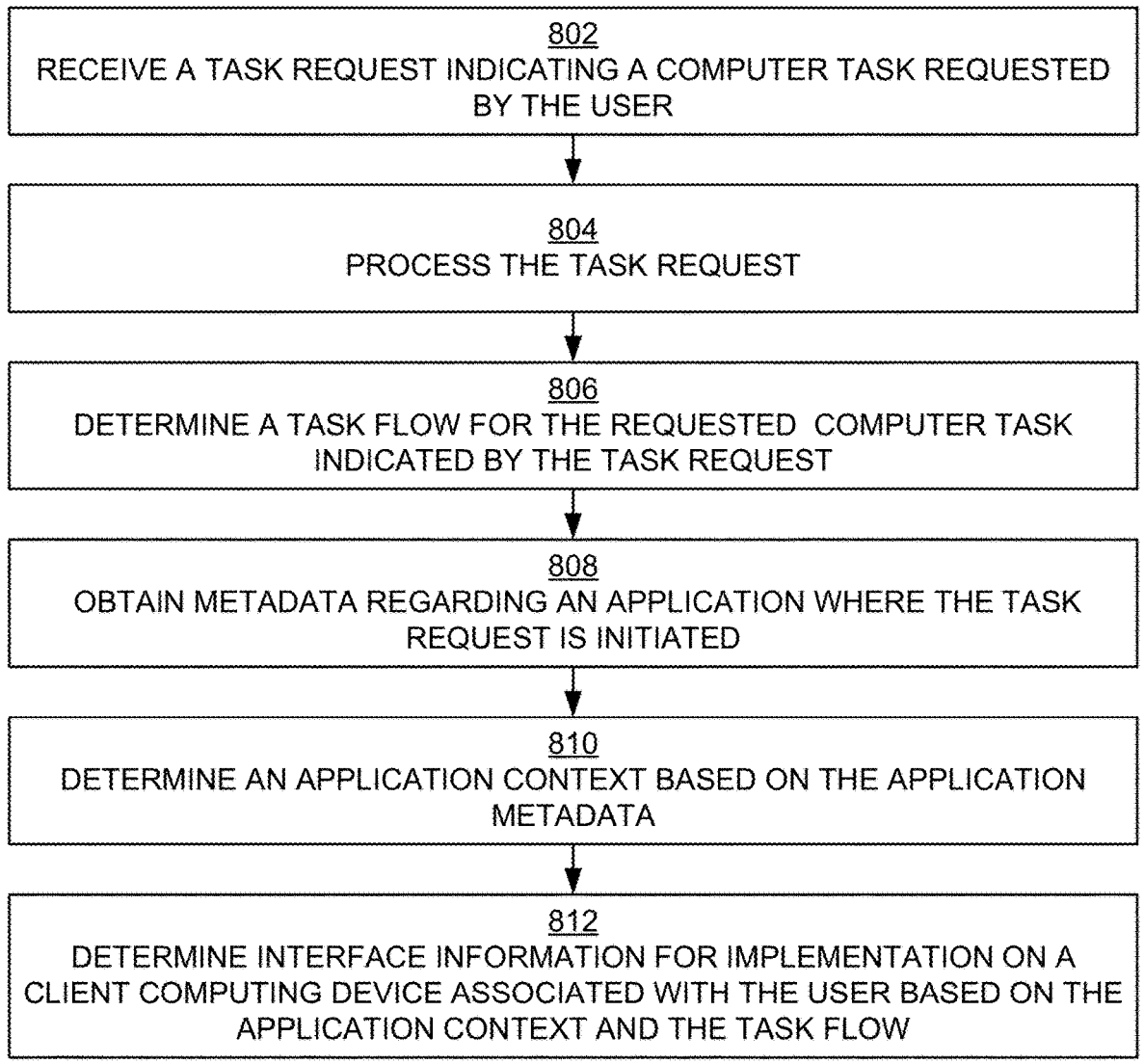
FIG. 8 is a simplified flow chart showing a process for determining interface information for assisting a user to complete a computer task requested by the user.

FIG. 8 is a simplified flow chart showing a process for determining interface information for assisting a user to complete a computer task requested by the user. The processing depicted in FIG. 8 may be implemented in software (e.g., code, instructions, program) executed by one or more processing units (e.g., processors, cores), hardware, or combinations thereof. The software may be stored in memory (e.g., on a non-transitory computer-readable storage medium such as a on a memory device). The particular series of processing steps depicted in FIG. 8 is not intended to be limiting. It is appreciated that the processing steps may be performed in an order different from that depicted in FIG. 8, and that not all the steps depicted in FIG. 8 need be performed. In certain embodiments, the processing depicted in FIG. 8 may be performed by the user task component 110, task flow component 112, and interface component 114, shown in FIGS. 1-2 and 7.

In certain embodiments, the interface determination for facilitating the user to complete a computer task requested by the user may be broken into the following phases:

At 802, a task request may be received. The received task request received at 802 may include information indicating a computer task requested by a user to be performed. The request computer task may be selected by the user from the one or more suggestions presented to the user in the application 120 as illustrated in FIG. 6A. In some examples, the user request received at 802 may include application metadata information indicating an application context in which the user initiated the request. In some implementations, operations involved in 802 may be performed by a user task receiver the same as or substantially similar to the user task receiver 702 described and illustrated herein.

At 804, the task request received at 802 may be processed. This may involve extracting information indicating the computer task requested by the user from the received task request, extracting application context information described above, and/or any other operations. The processing at 804 may determine one or more pairs of object/action as indicted by the requested computer task. Such an action/object pair may indicate an action to be performed on the corresponding object. As described above, this may involve determining a keyword type or speech associated with the individual keywords included in computer task request information received at 802. In some implementations, operations involved in 804 may be performed by a user task processor the same as or substantially similar to the user task processor 702 described and illustrated herein.

At 806, a task flow may be determined for the computer task requested by the user as indicated by the task request received at 802. Determining the task flow for the user requested computer task by the task flow component 112 may involve analyzing the computer task requested by the user to obtain. The task flow determined at 806 may include information indicating one or more procedures, steps, processes and/or any other task components for performing the computer task. In some implementations, operations involved in 806 may be performed by a task flow component the same as or substantially similar to the task flow component 112 described and illustrated herein.

At 808, metadata information regarding an application where the task requested received at 802 by the user is obtained. The metadata information received at 808 may indicate a name of the application where the user initiated the computer request received, an interface or page within the application where the user initiated the computer task request received, a position with the interface or page within the application where the user initiated the computer task request received. In some implementations, the application metadata information received at 808 may be included in the task request received at 802. In some implementations, operations involved in 808 may be performed by an application context determination component the same as or substantially similar to application context determination component 706 described and illustrated herein.

At 810, an application context in which the user initiated the requested computer task may be determined based on the application metadata obtained at 808. In one embodiment, after the user application metadata information is obtained at 808, application information may be obtained from the application metadata store 202 for details about application identified by the application metadata information obtained. For example, as illustration, the application metadata information received may indicate the user initiated the computer task request at a particular interface provided by the application, for example in the project management interface as shown in FIGS. 6A-6B. In that example, details about the identified particular interface may be obtained at 810, for example, such as a frame size of the particular interface, one or more controls provided in the particular interface, look and feel of the particular interface, one or more context provided in the particular interface, and/or any other interface information associated with the particular interface. In some implementations, operations involved in 810 may be performed by an application context determination component the same as or substantially similar to application context determination component 706 described and illustrated herein.

At 812, interface information may be determined for implementation on a client computing device associated with the user that initiated the task request received at 802. The interface information determined at 812, when implemented on the client computing device, e.g., such as the client computing device 118a, may cause the client computing device to facilitate the user to complete the requested computer task in accordance with the task flow determined at 806.

Figure 9A:
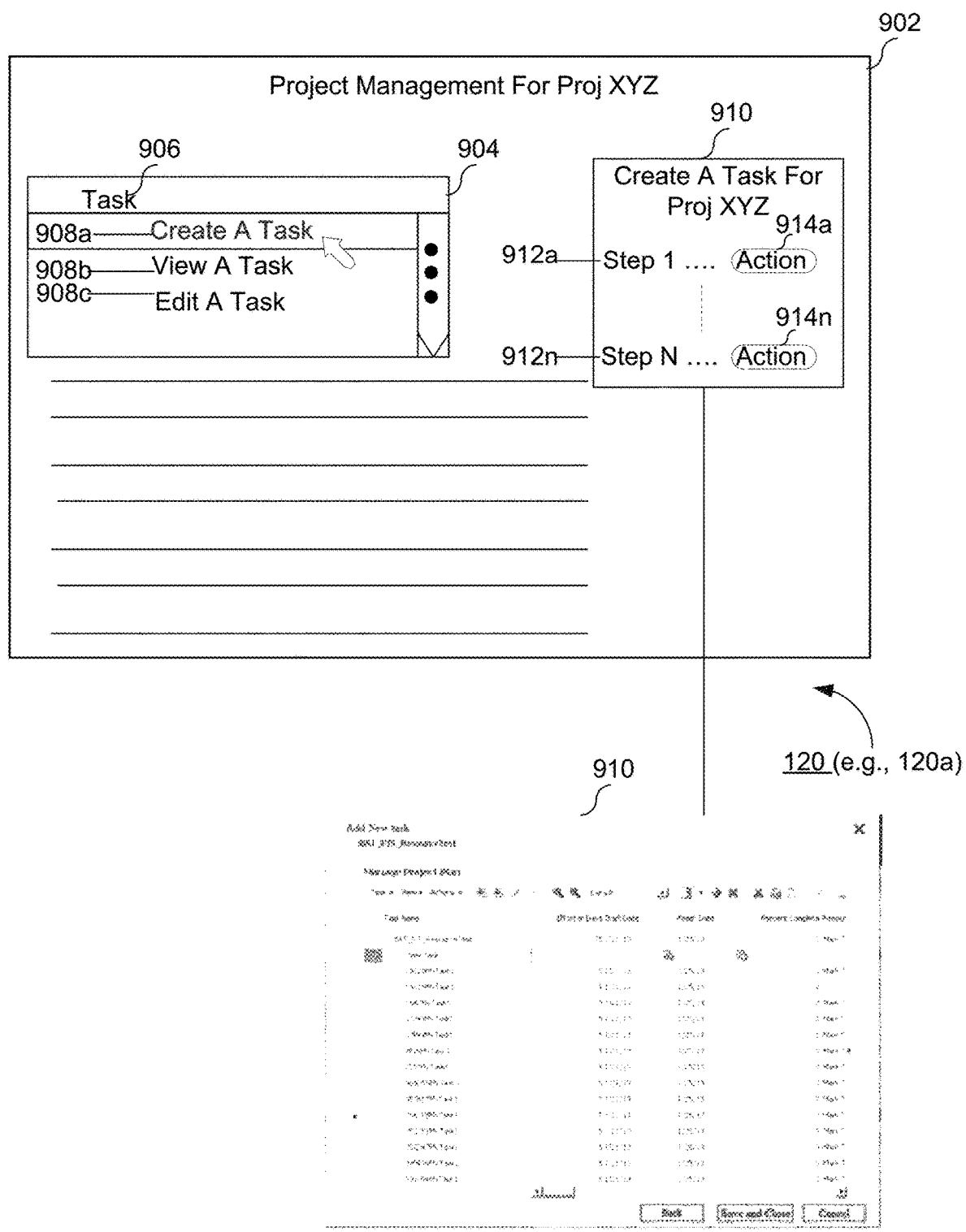
FIG. 9A illustrates an example of facilitating a user to complete a computer task within an interface of an application in response to receiving an incomplete user query through a search interface provided by the application.

FIG. 9A illustrates an example of facilitating a user to complete a computer task within an interface of an application in response to receiving an incomplete user query through a search interface provided by the application. It will be described with reference to FIG. 1. As shown, a user interface 902 for managing a project XYZ may be provided in the application 120, such as the application 120a, shown in FIG. 1. As also shown, in this example, within interface 902, a search interface 904 is provided. Through the search interface 904, a user is enabled to input a user query for a computer task intended by the user. As shown in this example, as the user is inputting the user query 906, which is incomplete, a list of suggestions 906 may be presented by system 100 to the user to suggest one or more computer tasks for the user. In this example, the user selects suggestion 908a from the list. After the user selects the suggestion 908a, an interface 910 may be presented to the user to facilitate the user to perform 908a in accordance with a task flow for 908a. As shown, the task flow may include one or more steps 912, such steps 912a-n as shown, in a specific order. As also shown, one or more field controls 914, such as the field controls 914a-n, may be provided in the interface 910, such that the user is enabled to complete the requested computer task—i.e., to create a new task for project XYZ, within interface 910 in accordance with the task flow. This allows the user to complete the requested computer task within the current interface 902 of the application 120 the user is engaging. A detailed example of an interface 910 is provided at the bottom of FIG. 9A for illustration. In some implementations, the presentation of the interface 910 as illustrated in FIG. 9A within the interface 902 where the user initiated the incomplete user query 906 is referred to as a "quick action" mode.

Figure 9B:
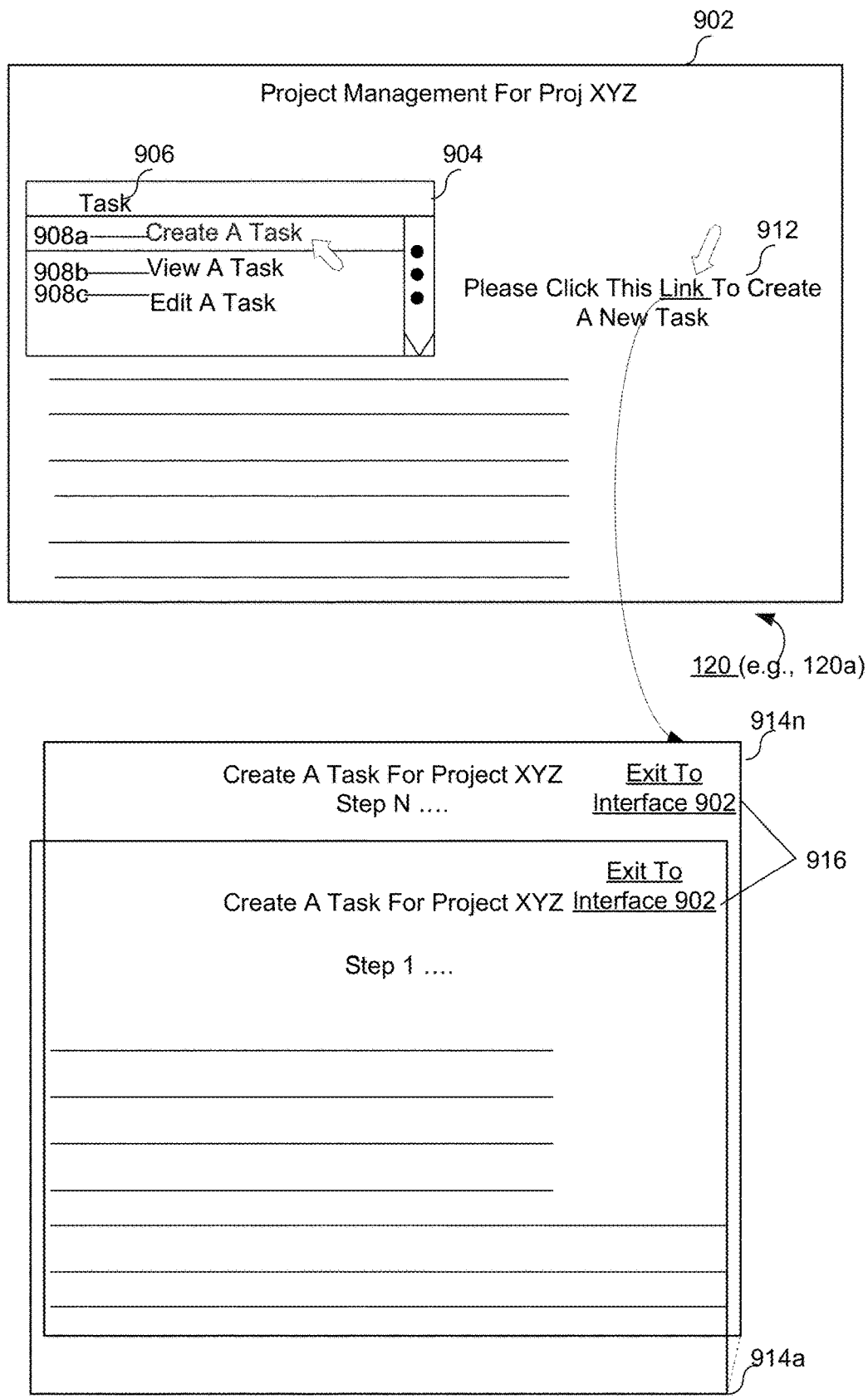
FIG. 9B illustrates another example of facilitating a user to complete a computer task within an interface of an application in response to receiving an incomplete user query through a search interface provided by the application.

FIG. 9B illustrates another example of facilitating a user to complete a computer task within an interface of an application in response to receiving an incomplete user query through a search interface provided by the application. For simplicity and clarity, it will be described with comparison to FIG. 9A. As can be seen in this example, instead of providing interface 910 within the interface 902 to facilitate the user to complete the requested computer task 908a without leaving application 120, a link 912 or any other type of control 912 may be provided to enable the user to complete the requested computer task through one or more different interfaces 914 from interface 912, such as the interfaces 914a-n shown in FIG. 9B. The interfaces 914 may enable the user to complete the requested computer task in accordance with the task flow determined by the system 100 for the performing the requested computer task as described above. The interfaces (or pages) 914 may be provided by an application different from the application where the user input the incomplete user query. As also shown, controls 916 may be provided in interfaces 914 to enable the user to return to interface 912 when desired. In some implementations, the redirection of the user from interface 902 to interface(s) 914 for completing the requested computer task is referred to as a "navigation mode".

Figure 9C:
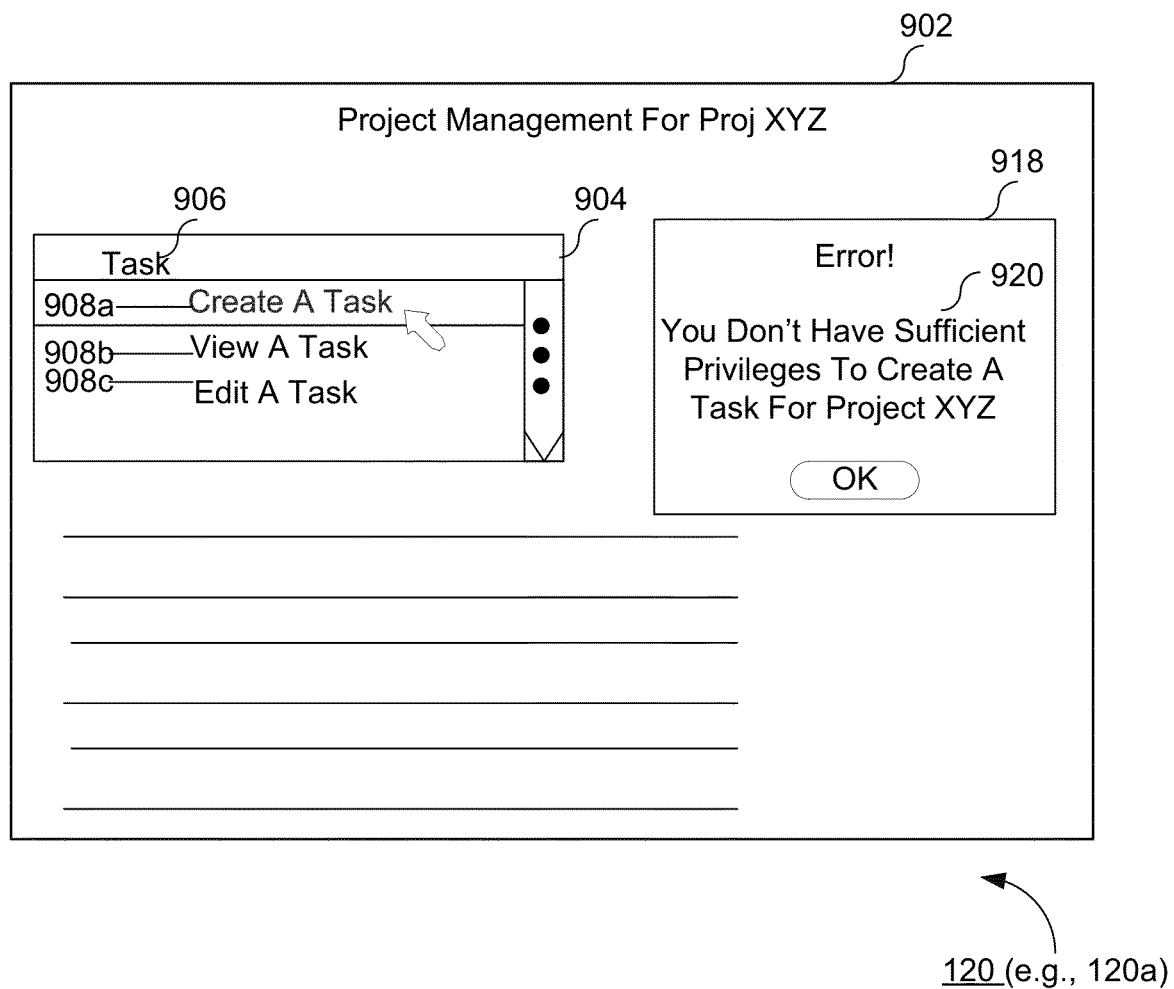
FIG. 9C illustrates still another example of facilitating a user to complete a computer task within an interface of an application in response to receiving an incomplete user query through a search interface provided by the application.

FIG. 9C illustrates still another example of facilitating a user to complete a computer task within an interface of an application in response to receiving an incomplete user query through a search interface provided by the application. As shown in this example, an interface 918 may be provided within interface 902 of the application 120 in response to the user requested computer task 908a having been received through the search interface 904. As shown, the interface 918 may present an error message 920 informing the user that he/she does not have sufficient privileges to create a task for project XYZ as requested.

Figure 10:
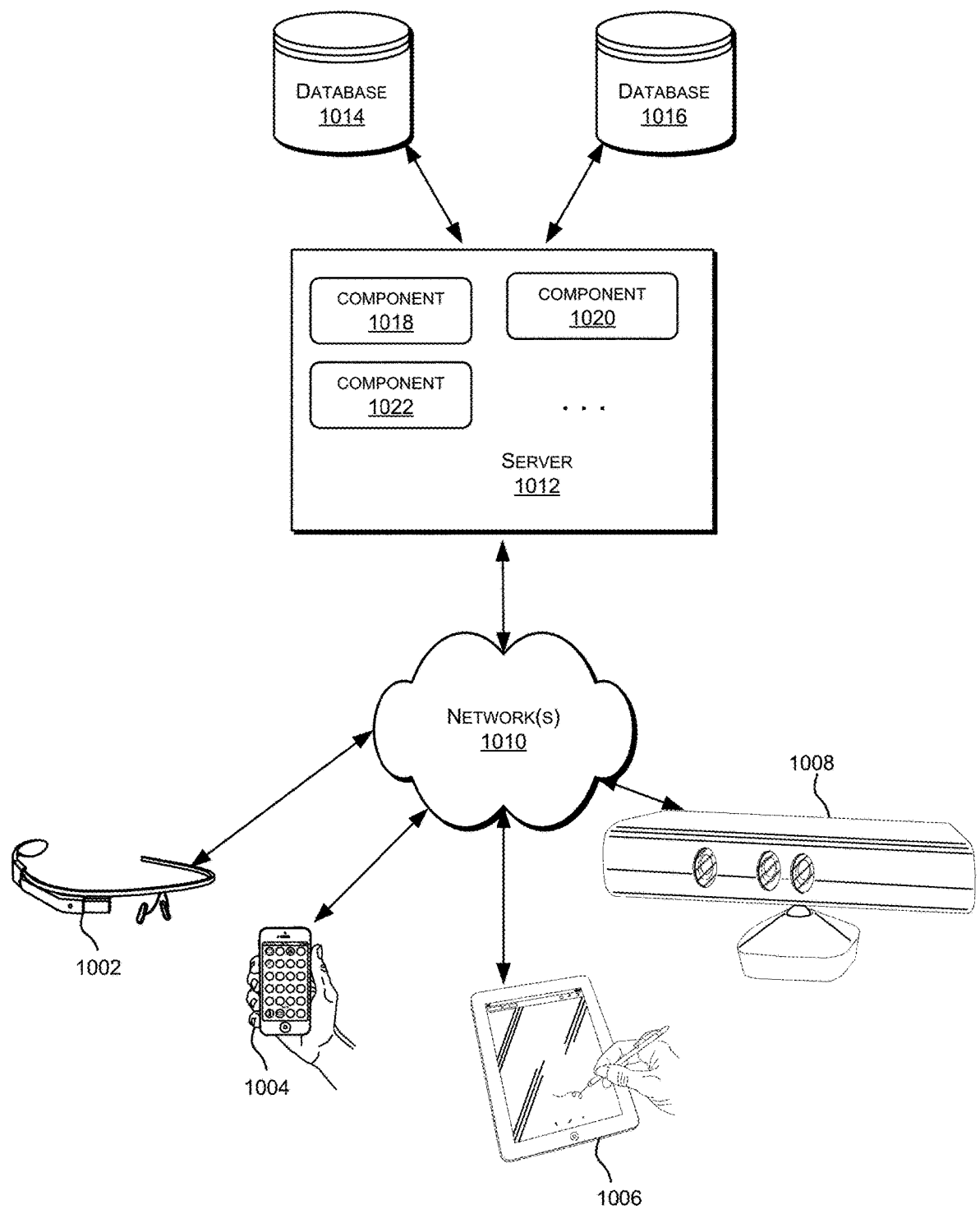
FIG. 10 depicts a simplified diagram of a distributed system for implementing an embodiment.

FIG. 10 depicts a simplified diagram of a distributed system 1000 for implementing an embodiment. In the illustrated embodiment, distributed system 1000 includes one or more client computing devices 1002, 1004, 1006, and 1008, which are configured to execute and operate client applications such as a web browser, proprietary client (e.g., Oracle Forms), or the like over one or more network(s) 1010. Server 1012 may be communicatively coupled with remote client computing devices 1002, 1004, 1006, and 1008 via network 1010.

In various embodiments, server 1012 may be adapted to run one or more services or software applications such as services and applications that provide the digital document (e.g., webpage) analysis and modification-related processing described above. In certain embodiments, server 1012 may also provide other services or software applications that can include non-virtual and virtual environments. In some embodiments, these services may be offered as web-based or cloud services, such as under a Software as a Service (SaaS) model to the users of client computing devices 1002, 1004, 1006, and/or 1008. Users operating client computing devices 1002, 1004, 1006, and/or 1008 may in turn utilize one or more client applications to interact with server 1012 to utilize the services provided by these components.

In the configuration depicted in FIG. 10, server 1012 may provide the functionality provided by adaptive webpages system 102. The functionality may be provided by software components 1018, 1020 and 1022 implemented on server 1012. In certain embodiments, client computing devices 1002, 1004, 1006, and/or 1008 may also implement one or more components that facilitate the interactions analysis and digital document modification functionality. Users operating the client computing devices may then utilize one or more client applications to use the services provided by these components. These components may be implemented in hardware, firmware, software, or combinations thereof. It should be appreciated that various different system configurations are possible, which may be different from distributed system 1000. The embodiment shown in FIG. 10 is thus one example of a distributed system for implementing an embodiment system and is not intended to be limiting.

Users may use client computing devices 1002, 1004, 1006, and/or 1008 to request digital documents (e.g., to request webpages). The documents received by a client in response to the document request may then be output to the user of the device via an interface of the client device. Although FIG. 10 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone, Android™, BlackBerry® 10, Palm OS). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device), and the like. The client devices may be capable of executing various different applications such as various Internet-related apps, communication applications (e.g., E-mail applications, short message service (SMS) applications) and may use various communication protocols.

Network(s) 1010 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 1010 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 1012 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1012 can include one or more virtual machines running virtual operating systems, or other computing architectures involving virtualization such as one or more flexible pools of logical storage devices that can be virtualized to maintain virtual storage devices for the server. In various embodiments, server 1012 may be adapted to run one or more services or software applications that provide the functionality described in the foregoing disclosure.

The computing systems in server 1012 may run one or more operating systems including any of those discussed above, as well as any commercially available server operating system. Server 1012 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 1012 may include one or more applications to analyze and consolidate data feeds and/or event updates received from users of client computing devices 1002, 1004, 1006, and 1008. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1012 may also include one or more applications to display the data feeds and/or real-time events via one or more display devices of client computing devices 1002, 1004, 1006, and 1008.

Distributed system 1000 may also include one or more data repositories such as databases 1014 and 1016. These databases may provide a mechanism for storing information such as user interactions information, usage patterns information, adaptation rules information, and other information used by embodiments of the present invention. Databases 1014 and 1016 may reside in a variety of locations. By way of example, one or more of databases 1014 and 1016 may reside on a non-transitory storage medium local to (and/or resident in) server 1012. Alternatively, databases 1014 and 1016 may be remote from server 1012 and in communication with server 1012 via a network-based or dedicated connection. In one set of embodiments, databases 1014 and 1016 may reside in a storage-area network (SAN). Similarly, any necessary files for performing the functions attributed to server 1012 may be stored locally on server 1012 and/or remotely, as appropriate. In one set of embodiments, databases 1014 and 1016 may include relational databases, such as databases provided by Oracle, that are adapted to store, update, and retrieve data in response to SQL-formatted commands.

Figure 11:
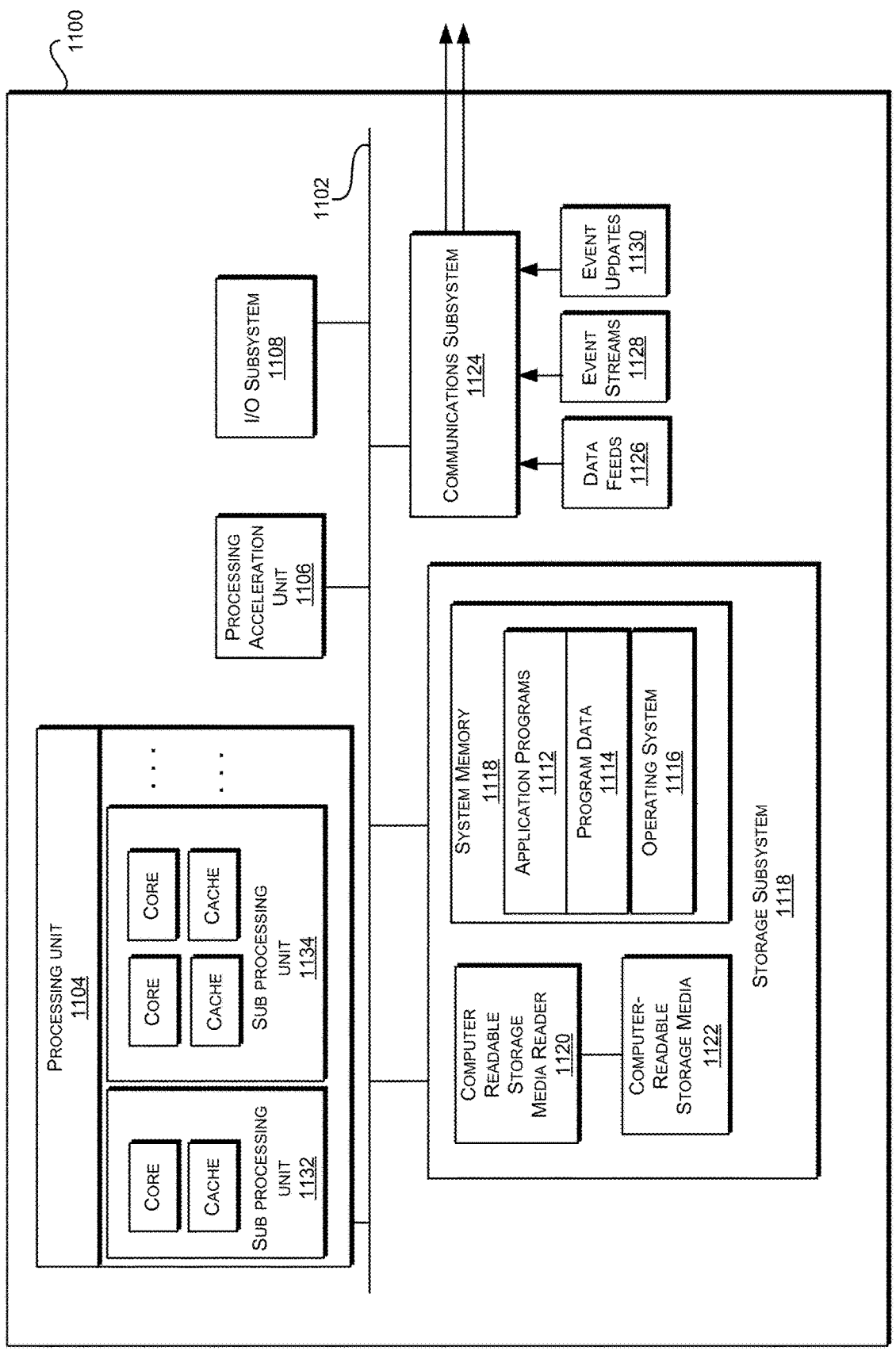
FIG. 11 illustrates an exemplary computer system that may be used to implement an embodiment of the present invention.

In certain embodiments, facilitating a user to request and perform a computer task described above may be offered as services via a cloud environment. FIG. 11 is a simplified block diagram of a cloud-based system environment 1100 in which services, such as facilitating a user to request and perform a computer task responsive to incomplete user query as described above, may be offered as cloud services, in accordance with an embodiment of the present disclosure. In the illustrated embodiment in FIG. 11, cloud infrastructure system 1102 may provide one or more cloud services that may be requested by users using one or more client computing devices 1104, 1106, and 1108. Cloud infrastructure system 1102 may comprise one or more computers and/or servers that may include those described above for server 1012. The computers in cloud infrastructure system 1102 may be organized as general purpose computers, specialized server computers, server farms, server clusters, or any other appropriate arrangement and/or combination.

Network(s) 1110 may facilitate communication and exchange of data between clients 1104, 1106, and 1108 and cloud infrastructure system 1102. Network(s) 1110 may include one or more networks. The networks may be of the same or different types. Network(s) 1110 may support one or more communication protocols, including wired and/or wireless protocols, for facilitating the communications.

FIG. 11 illustrates an exemplary computer system 1100 that may be used to implement an embodiment of the present invention. In some embodiments, computer system 1100 may be used to implement any of the various servers, client computing devices, and any other computer systems described above. As shown in FIG. 11, computer system 1100 includes various subsystems including a processing subsystem 1104 that communicates with a number of other subsystems via a bus subsystem 1102. These other subsystems may include a processing acceleration unit 1106, an I/O subsystem 1108, a storage subsystem 1118, and a communications subsystem 1124. Storage subsystem 1118 may include tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1104 controls the operation of computer system 1100 and may comprise one or more processing units 1132, 1134, etc. A processing unit may include be one or more processors, including single core or multicore processors, one or more cores of processors, or combinations thereof. In some embodiments, processing subsystem 1104 can include one or more special purpose co-processors such as graphics processors, digital signal processors (DSPs), or the like. In some embodiments, some or all of the processing units of processing subsystem 1104 can be implemented using customized circuits, such as application specific integrated circuits (ASICs), or field programmable gate arrays (FPGAs).

In some embodiments, the processing units in processing subsystem 1104 can execute instructions stored in system memory 1110 or on computer readable storage media 1122. In various embodiments, the processing units can execute a variety of programs or code instructions and can maintain multiple concurrently executing programs or processes. At any given time, some or all of the program code to be executed can be resident in system memory 1110 and/or on computer-readable storage media 1122 including potentially on one or more storage devices. Through suitable programming, processing subsystem 1104 can provide various functionalities described above for dynamically modifying documents (e.g., webpages) responsive to usage patterns.

In certain embodiments, a processing acceleration unit 1106 may be optionally provided for performing customized processing or for off-loading some of the processing performed by processing subsystem 1104 so as to accelerate the overall processing performed by computer system 1100.

I/O subsystem 1108 may include devices and mechanisms for inputting information to computer system 1100 and/or for outputting information from or via computer system 1100. In general, use of the term "input device" is intended to include all possible types of devices and mechanisms for inputting information to computer system 1100. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Ski® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term "output device" is intended to include all possible types of devices and mechanisms for outputting information from computer system 1100 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1118 provides a repository or data store for storing information that is used by computer system 1100. Storage subsystem 1118 provides a tangible non-transitory computer-readable storage medium for storing the basic programming and data constructs that provide the functionality of some embodiments. Software (programs, code modules, instructions) that when executed by processing subsystem 1104 provide the functionality described above may be stored in storage subsystem 1118. The software may be executed by one or more processing units of processing subsystem 1104. Storage subsystem 1118 may also provide a repository for storing data used in accordance with the present invention.

Storage subsystem 1118 may include one or more non-transitory memory devices, including volatile and non-volatile memory devices. As shown in FIG. 11, storage subsystem 1118 includes a system memory 1110 and a computer-readable storage media 1122. System memory 1110 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1100, such as during start-up, may typically be stored in the ROM. The RAM typically contains data and/or program modules that are presently being operated and executed by processing subsystem 1104. In some implementations, system memory 1110 may include multiple different types of memory, such as static random access memory (SRAM) or dynamic random access memory (DRAM).

By way of example, and not limitation, as depicted in FIG. 11, system memory 1110 may store application programs 1112, which may include various applications such as Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1122 may store programming and data constructs that provide the functionality of some embodiments. Software (programs, code modules, instructions) that, when executed by processing subsystem 1104 provides the functionality described above, may be stored in storage subsystem 1118. By way of example, computer-readable storage media 1122 may include non-volatile memory such as a hard disk drive, a magnetic disk drive, an optical disk drive such as a CD ROM, DVD, a Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1122 may provide storage of computer-readable instructions, data structures, program modules, and other data for computer system 1100.

In certain embodiments, storage subsystem 1118 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for storing computer-readable information.

In certain embodiments, computer system 1100 may support virtualization technologies, including but not limited to virtualization of processing and memory resources. For example, computer system 1100 may provide support for executing one or more virtual machines. Computer system 1100 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1100. Accordingly, multiple operating systems may potentially be run concurrently by computer system 1100. Each virtual machine generally runs independently of the other virtual machines.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to establish a communication channel to one or more client devices via the Internet for receiving and sending information from and to the client devices. For example, adaptive webpages system 102 depicted in FIGS. 1 and 2 may receive user interactions information and webpage requests from client devices using communication subsystem 1124. Additionally, communication subsystem 1124 may be used to communicate webpages from adaptive webpages system 102 to the requesting clients.

Communication subsystem 1124 may support both wired and/or wireless communication protocols. For example, in certain embodiments, communications subsystem 1124 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

Communication subsystem 1124 can receive and transmit data in various forms. For example, in some embodiments, in addition to other forms, communications subsystem 1124 may receive input communication in the form of structured and/or unstructured data feeds 1126, event streams 1128, event updates 1130, and the like. For example, communications subsystem 1124 may be configured to receive (or send) data feeds 1126 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1124 may be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to communicate data from computer system 1100 to other computer systems or networks. The data may be communicated in various different forms such as structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1100 depicted in FIG. 11 is intended only as a specific example. Many other configurations having more or fewer components than the system depicted in FIG. 11 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation such as by executing computer instructions or code, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A method for assisting a user to request and complete a computer task, the method comprising:
   receiving an incomplete user query from the user through a search interface provided by an application;
   in response to receiving the incomplete user query:
      determining a context of the application in which the user inputs the incomplete user query, wherein the context of the application, in which the user inputs the incomplete user query, is based on previous interactions of the user with the application;
      determining a context of the user, wherein the context of the user comprises one of a role, a responsibility, a domain, a department and/or a region associated with the user;
      determining a context of the incomplete user query, wherein the context of the incomplete user query comprises a position within the application when the user inputs the incomplete user query;
      generating one or more suggestions indicating the computer task by which an action is performed on an object, wherein the object comprises data from a data source comprising a data structure, and wherein the action comprises a data related action to apply to the data from the data source,
      wherein generating each of the one or more suggestions includes:
         determining the action and the object associated with the action for performing the computer task based on the determined context of the application, the determined context of the user, and the determined context of the incomplete user query, wherein the determined action and the object associated with the action is an action/object pair for the computer task;
         transmitting the one or more suggestions for presentation to the user through an interface of the application;
         receiving, from the application, the request to perform the computer task by the user;
         determining a task flow comprising one or more steps for performing the computer task for the action/object pair;
         determining interface information for implementation on a computing device associated with the user such that one or more interfaces are presented to the user to facilitate the user to complete the computer task in accordance with the task flow, wherein the interface information comprises one or more interface controls for completing the computer task; and
         providing the one or more interface controls for completing the computer task to the user.

2. The method of claim 1, wherein the context of the application includes a position within the application where the user inputs the incomplete user query, one or more pages the user has traversed before the user inputs the incomplete user query, one or more other applications the user has engaged before the user inputs the incomplete user query, one or more other computer tasks performed by the user using the application before the user inputs the incomplete user query, and/or one or more objects interacted by the user before the user inputs the incomplete user query.

3. The method of claim 1, wherein the action and the object are determined based on a relevance of the action and the object to the context of the application.

4. The method of claim 1, wherein determining the action and the object based on the context of the user includes determining, based on the context of the user, that the user is authorized to perform the action on the object, or that the user is authorized to access the object.

5. The method of claim 1, further comprising determining a search context with respect to the incomplete user query, and wherein the determination of the action and the object is further based on the search context.

6. The method of claim 5, wherein the search context comprises one or more user queries input by the user during a same search session as the one in which the incomplete user query is input by the user.

7. The method of claim 1, wherein the determined interface information, when implemented on a client computing device, causes the client computing device to facilitate the user to complete the computer task within the application.

8. The method of claim 1, wherein the determined interface information, when implemented on a client computing device, causes the client computing device to facilitate the user to complete the computer task within another application independent and separate from the application from which the request to perform the computer task is received.

9. The method according to claim 1, wherein the action comprises one or more actions to change the data from the one or more data sources.

10. The method according to claim 1, wherein the data source comprises one of a table, a file, a database, or a data warehouse.

11. The method according to claim 1, wherein the action comprises one of creating, editing, deleting, copying or viewing a database object.

12. A system comprising:
a processor; and
a memory coupled with and readable by the processor and having stored therein a set of instructions which, when executed by the processor, causes the processor to assist a user to request and complete a computer task by:
receiving an incomplete user query from the user through a search interface provided by an application;
in response to receiving the incomplete user query:
determining a context of the application in which the user inputs the incomplete user query, wherein the context of the application, in which the user inputs the incomplete user query, is based on previous interactions of the user with the application;
determining a context of the user, wherein the context of the user comprises one of a role, a responsibility, a domain, a department and/or a region associated with the user;
determining a context of the incomplete user query, wherein the context of the incomplete user query comprises a position within the application when the user inputs the incomplete user query;
generating one or more suggestions indicating the computer task by which an action is performed on an object, wherein the object comprises data from a data source comprising a data structure, and wherein the action comprises a data related action to apply to the data from the data source,
wherein generating each of the one or more suggestions includes:
determining the action and the object associated with the action for performing the computer task based on the determined context of the application, the determined context of the user, and the determined context of the incomplete user query, wherein the determined action and the object associated with the action is an action/object pair for the computer task;
transmitting the one or more suggestions for presentation to the user through an interface of the application;
receiving, from the application, the request to perform the computer task by the user;
determining a task flow comprising one or more steps for performing the computer task for the action/object pair;
determining interface information for implementation on a computing device associated with the user such that one or more interfaces are presented to the user to facilitate the user to complete the computer task in accordance with the task flow, wherein the interface information comprises one or more interface controls for completing the computer task; and
providing the one or more interface controls for completing the computer task to the user.

13. The system of claim 12, wherein the action and the object are determined based on a relevance of the action and the object to the context of the application.

14. The system of claim 12, wherein determining the action and the object based on the context of the user includes determining, based on the context of the user, that the user is authorized to perform the action on the object, or that the user is authorized to access the object.

15. The system of claim 12, wherein assisting the user to request and complete the computer task further comprises determining a search context with respect to the incomplete user query, and wherein the determination of the action and the object is further based on the search context.

16. The system of claim 12, wherein the determined interface information, when implemented on a client computing device, causes the client computing device to facilitate the user to complete the computer task within the application.

17. The system of claim 12, wherein the determined interface information, when implemented on a client computing device, causes the client computing device to facilitate the user to complete the computer task within another application independent and separate from the application from which the request to perform the computer task is received.

18. A non-transitory computer-readable memory device comprising a set of instructions stored therein which, when executed by a processor, causes the processor to assist a user to request and complete a computer task by:
receiving an incomplete user query from the user through a search interface provided by an application;
in response to receiving the incomplete user query:
determining a context of the application in which the user inputs the incomplete user query, wherein the context of the application, in which the user inputs the incomplete user query, is based on previous interactions of the user with the application;

determining a context of the user, wherein the context of the user comprises one of a role, a responsibility, a domain, a department and/or a region associated with the user;

determining a context of the incomplete user query, wherein the context of the incomplete user query comprises a position within the application when the user inputs the incomplete user query;

generating one or more suggestions indicating the computer task by which an action is performed on an object, wherein the object comprises data from a data source comprising a data structure, and wherein the action comprises a data related action to apply to the data from the data source, wherein generating each of the one or more suggestions includes:

determining the action and the object associated with the action for performing the computer task based on the determined context of the application, the determined context of the user, and the determined context of the incomplete user query, wherein the determined action and the object associated with the action is an action/object pair for the computer task;

transmitting the one or more suggestions for presentation to the user through an interface of the application;

receiving, from the application, the request to perform the computer task by the user;

determining a task flow comprising one or more steps for performing the computer task for the action/object pair;

determining interface information for implementation on a computing device associated with the user such that one or more interfaces are presented to the user to facilitate the user to complete the computer task in accordance with the task flow, wherein the interface information comprises one or more interface controls for completing the computer task; and providing the one or more interface controls for completing the computer task to the user.

19. The computer-readable memory device of claim 18, wherein assisting the user to request and complete the computer task further comprises determining a search context with respect to the incomplete user query, and wherein the determination of the action and the object is further based on the search context.

\* \* \* \* \*

UNITED STATES PATENT AND TRADEMARK OFFICE
CERTIFICATE OF CORRECTION

PATENT NO. : 11,294,908 B2
APPLICATION NO. : 14/937713
DATED : April 5, 2022
INVENTOR(S) : Pepakayala et al.

It is certified that error appears in the above-identified patent and that said Letters Patent is hereby corrected as shown below:

In the Specification

In Column 3, Line 47, delete "6 A" and insert -- 6A --, therefor.

In Column 3, Line 50, delete "6 B" and insert -- 6B --, therefor.

In Column 11, Line 11, delete "store" and insert -- store. --, therefor.

In Column 12, Line 21, before "possible" delete "a".

In Column 14, Line 19, after "that" delete "the".

In Column 17, Line 28, after "with" delete "the".

In Column 20, Line 2, after "with" delete "the".

In Column 20, Line 15, delete "6 A" and insert -- 6A --, therefor.

In Column 20, Line 36, delete "6 B" and insert -- 6B --, therefor.

In Column 32, Line 47, delete "thereof" and insert -- thereof) --, therefor.

Signed and Sealed this
Twenty-third Day of August, 2022

Katherine Kelly Vidal
*Director of the United States Patent and Trademark Office*